(12) United States Patent
Otsuki et al.

(10) Patent No.: US 7,096,225 B2
(45) Date of Patent: Aug. 22, 2006

(54) COMMUNICATION CONDUIT SETTING MANAGING METHOD, SYSTEM THEREOF, STORING MEDIUM STORING COMMUNICATION CONDUIT SETTING MANAGING PROGRAM, COMMUNICATION CONDUIT MAINTENANCE MANAGING METHOD, SYSTEM THEREOF, STORING MEDIUM STORING COMMUNICATION CONDUIT MAINTENANCE MANAGING PROGRAM, AND COMMUNICATION CONDUIT MANAGING SYSTEM

(75) Inventors: Kazuhiro Otsuki, Tokyo (JP); Jiro Mori, Hokkaido (JP); Yasuo Saito, Hokkaido (JP)

(73) Assignee: NTT Infrastructure Network Corporation, Tokyo (JP)

( * ) Notice: Subject to any disclaimer, the term of this patent is extended or adjusted under 35 U.S.C. 154(b) by 260 days.

(21) Appl. No.: 10/263,864

(22) Filed: Oct. 3, 2002

(65) Prior Publication Data
US 2003/0065674 A1 Apr. 3, 2003

(30) Foreign Application Priority Data
Oct. 3, 2001 (JP) ............................ P2001-307727

(51) Int. Cl.
*G06F 17/30* (2006.01)
(52) U.S. Cl. .................... 707/100; 707/101; 707/10
(58) Field of Classification Search ......... 707/1–104.1; 701/207–210; 725/60
See application file for complete search history.

(56) References Cited

U.S. PATENT DOCUMENTS

| | | | |
|---|---|---|---|
| 5,559,707 A * | 9/1996 | DeLorme et al. | ............ 701/200 |
| 5,818,737 A | 10/1998 | Orr et al. | |
| 6,173,232 B1 * | 1/2001 | Nanba et al. | ................ 701/209 |
| 6,662,105 B1 * | 12/2003 | Tada et al. | ................... 701/209 |
| 6,748,400 B1 * | 6/2004 | Quick | ...................... 707/104.1 |
| 2001/0027375 A1 * | 10/2001 | Machida et al. | ............ 701/209 |
| 2002/0059320 A1 | 5/2002 | Tamaru | |
| 2003/0212996 A1 * | 11/2003 | Wolzien | ....................... 725/60 |

OTHER PUBLICATIONS

NTT Infranet's Solutions, Business Communication, Feb. 1, 2000, vol. 37, No. 2, pp. 46-57.

* cited by examiner

*Primary Examiner*—Charles Rones
*Assistant Examiner*—Neveen Abel-Jalil
(74) *Attorney, Agent, or Firm*—Brenda O. Holmes; Kilpatrick Stockton LLP

(57) ABSTRACT

If there exists a route having imperfection in facilities as the result of judgement in step S27, contents and route of the imperfection of this facilities are specified (step S31), and then it is judged whether the facilities having the imperfection can be obtained from outside including other facilities and public facilities, and it is judged whether the facilities having the imperfection can be obtained by new construction (step S33) If it is impossible to obtain to the facilities from outside and to obtain the facilities by new construction, this route is output as impossible route (step S35).

24 Claims, 14 Drawing Sheets

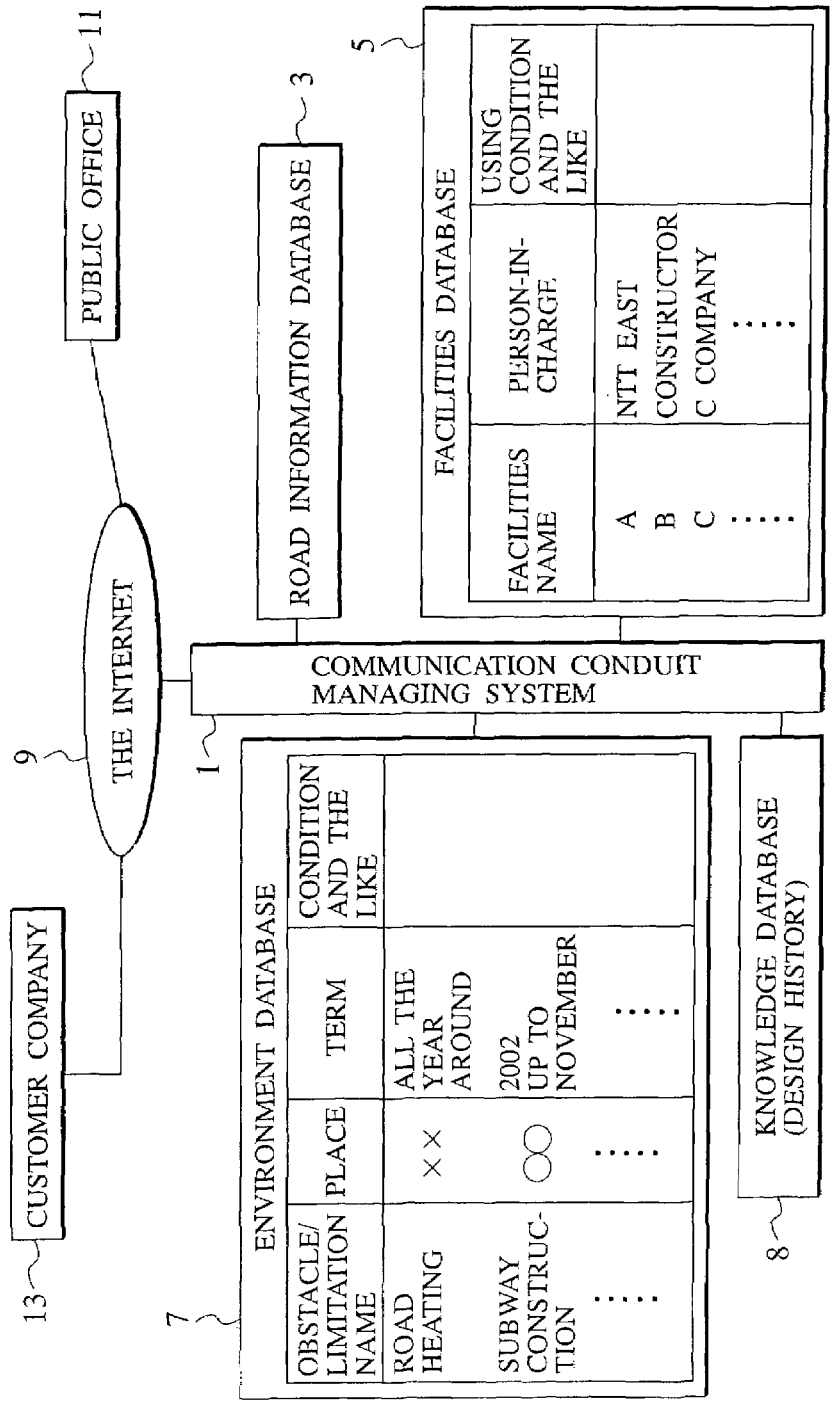

COMMUNICATION CONDUIT SETTING MANAGING METHOD, SYSTEM THEREOF, STORING MEDIUM STORING COMMUNICATION CONDUIT SETTING MANAGING PROGRAM, COMMUNICATION CONDUIT MAINTENANCE MANAGING METHOD, SYSTEM THEREOF, STORING MEDIUM STORING COMMUNICATION CONDUIT MAINTENANCE MANAGING PROGRAM, AND COMMUNICATION CONDUIT MANAGING SYSTEM

CROSS REFERENCE TO RELATED APPLICATION

This application claims benefit of priority under 35 U.S.C. § 119 to Japanese Patent Application No.2001-307727, filed on Oct. 3, 2001, the entire contents of which are incorporated by reference herein.

BACKGROUND OF THE INVENTION

1. Field of the Invention

The present invention relates to a communication conduit setting managing method which sets a communication conduit for accommodating communication materials including an optical fiber and a cable between a desired starting point and an desired end point, and which accumulates and manages data of this set conduit and various data used for setting the conduit. The invention also relates to a system of the communication conduit setting managing method. The invention also relates to a storing medium storing the communication conduit setting managing program therein, a communication conduit maintenance managing method, a system thereof, and a storing medium storing a communication conduit maintenance managing program therein. The invention also relates to a communication conduit managing system which is connected, through a network, to an optical monitoring system which detects abnormal condition of the optical cable, and which sends abnormality information of the optical cable obtained from the optical monitoring system to a terminal including a cellular phone of a person in charge of maintenance as an alarm mail.

2. Description of the Related Art

It is extremely important for companies to establish an optical cable network for transmitting a large quantity of information due to an IT revolution, and as liberalization and globalization of communication are progressed, need of construction of optical cable network utilizing a communication conduit (a telephone-tunnel, a conduit, a manhole, a handhole, an information box, an underground multi-purpose duct, a utility pole, a drainpipe, a heat supply pipe, a cable accommodating facilities such as wiring in a building) for accommodating communication materials (an optical fiber cable, metal cable, closure (connection), amplifier and the like) is increased. In order to construct such an optical cable network, it is necessary to utilize a communication conduit buried in a road or to newly bury a communication conduit in a road.

When a communication conduit which has already been buried is to be utilized, it is necessary to survey whether the communication conduit owned by a certain company can be utilized, to request for utilization, and to make a plan for constructing own communication conduit after the response to the request, to design, and to construct. Therefore, an enormous amount of time and operation are required, and the best route for constructing the optical cable network cannot be obtained by the above process.

As described above, the laying down of cable including the optical fiber into a road has a problem that a certain company conventionally excavates a road by its own technique and buried a communication conduit for the company or a group of the company, or the company utilizes the buried communication conduit that is owned by the company. There is no system which can efficiently set a route between a desired starting point and a desired end point by utilizing a communication conduit owned by one such as another company without separately carrying out wasteful excavating operation of a road. The burial and utilization of such a communication conduit is carried out by a certain company such as a telephone company, an electricity-generating company, an railroad company or the like, and there is no system which buries and utilizes the communication conduit according to requirement from a general company.

Further, when a communication conduit which has already been buried is to be utilized, there is a problem that enormous amounts of time and operation are required to survey whether the communication conduit owned by a certain company can be utilized, to request for utilization, and to make a plan for constructing own communication conduit after the response to the request, to design, and to construct.

SUMMARY OF THE INVENTION

The present invention has been accomplished in view of the above circumstances, and it is an object of the invention to provided a communication conduit setting managing method and a system thereof, a storing medium storing a communication conduit setting managing program, a communication conduit maintenance managing method, a system thereof, a storing medium storing a communication conduit maintenance managing program, capable of efficiently setting a route from a desired starting point to a desired end point made of communication materials including a conduit accommodating a cable and capable of easily carrying out maintenance during planning, designing, and construction and after execution. It is also an object of the invention to provide a communication conduit managing system that sends abnormal condition information of the optical cable to a terminal including a cellular phone of a person in charge of maintenance as an alarm mail.

To achieve the above object, there is provided a communication conduit setting managing method for setting a communication conduit which accommodates a communication material between desired starting point and end point, comprising the steps of: accumulating and managing road network information as an road information database; accumulating and managing facilities information which is useful for setting a conduit as a facilities database together with auxiliary information including a place of facilities, a person-in-charge, and a facilities using condition; accumulating and managing names of obstacle and limitation against the setting of the conduit, as obstacle/limitation database, together with accessory information including contents of obstacle/limitation, a place, a period of time, and an avoiding condition of obstacle/limitation; referring to the road information database, the facilities database and the obstacle/limitation database, thereby retrieving at least one completion-possible route candidate which can complete from the starting point to the end point such that there is no lack or imperfection in the facilities including supplement or new construction of facilities in a route on a road connecting between the starting point and the end point; and calculating a route length, reliability and cost of the retrieved at least one completion-possible route candidate, and determining an optimal route based on the calculated, route length, reliability and cost.

According to the present invention, the road information database, the facilities database and the obstacle/limitation database are referred to, thereby retrieving at least one completion-possible route candidate which can complete from the starting point to the end point such that there is no lack or imperfection in the facilities including supplement or new construction of facilities in a route on a road connecting between the starting point and the end point; and calculating a route length, reliability and cost of the retrieved at least one completion-possible route candidate, and determining an optimal route based on the calculated, route length, reliability and cost. Therefore, it is possible to efficiently determine the optimal route including not only own facilities but also supplement from outside or facilities of new construction while avoiding obstacle/limitation and while taking the route length, the reliability and the cost into consideration, only by inputting the starting point and the end point of the route required by a customer.

To achieve the above object, there is provided a communication conduit setting managing method for setting a communication conduit which accommodates a communication material between desired starting point and end point, comprising the steps of: accumulating and managing road network information as an road information database; accumulating and managing facilities information which is useful for setting a conduit as a facilities database together with auxiliary information including a place of facilities, a person-in-charge, and a facilities using condition; accumulating and managing names of obstacle and limitation against the setting of the conduit, as obstacle/limitation database, together with accessory information including contents of obstacle/limitation, a place, a period of time, and an avoiding condition of obstacle/limitation; inputting place information of the starting point and the end point; retrieving a plurality of route candidates between the starting point and the end point on a road from the road information database based on the input place information of the starting point and the end point; retrieving an obstacle/limitation status existing on a route in each of the route candidates; judging whether there exists an obstacle/limitation in each of the routes from a result of this retrieval; selecting a route in which there is no obstacle/limitation from a result of the judgement of the obstacle/limitation as a route having no obstacle/limitation; judging whether an obstacle/limitation can be avoided based on an avoiding condition of obstacle/limitation when there exists a route having the obstacle/limitation from a result of the judgement of the obstacle/limitation; selecting this route as a route capable of avoiding the obstacle/limitation when it was judged that the obstacle/limitation can be avoided from the result of the judgment; retrieving facilities status existing on the route in each of the plurality of route candidates from the facilities database; judging whether there is a lack or imperfection in facilities in each of routes from a result of this retrieval; selecting a route having no lack or imperfection in facilities from a result of judgement of this facilities as a facilities completion route; judging whether the facilities having the lack or imperfection can be obtained from outside or can be newly constructed when there exists a route having a lack or imperfection in facilities from a result of the facilities; setting each imperfection of the route so that the facilities are obtained from outside when it is judged that the facilities can be obtained from outside based on a result of the judgment; setting each imperfection of the route so that the facilities are newly be constructed when it is judged that the facilities are newly be constructed based on a result of the judgment; selecting, as a facilities supplement route, a route which can be completed as a route having no lack or imperfection in facilities on a route from the starting point to the end point by combining the imperfection of each route which is set such that the facilities are obtained from outside and the imperfection of each route which is set such that the facilities are newly constructed with each other to replenish the imperfection; verifying the selected route having no obstacle/limitation, the obstacle/limitation avoidable route, the selected facilities completion route and the facilities supplement route, and obtaining as at least one route which can be completed from the starting point to the end point as at least one completion-possible route candidate; and calculates a route length, reliability and cost of the obtained at least one completion-possible route candidate, and determining an optimal route based on the calculated route length, reliability and cost.

According to the present invention, the method comprises the steps of: retrieving a plurality of route candidates between the starting point and the end point on a road from the road information database based on the input place information of the starting point and the endpoint; retrieving an obstacle/limitation status existing on a route in each of the route candidates; judging whether there exists an obstacle/limitation in each of the route candidates; selecting a route in which there is no obstacle/limitation as a route having no obstacle/limitation; judging whether obstacle/limitation can be avoided based on an avoiding condition of obstacle/limitation when there exists a route having the obstacle/limitation; selecting this route as a route capable of avoiding the obstacle/limitation when it was judged that the obstacle/limitation can be avoided from the result of the judgment; retrieving facilities status existing on the route in each of the plurality of route candidates from the facilities database; judging whether there is a lack or imperfection in facilities in each of routes; selecting a route having no lack or imperfection in facilities as a facilities completion route; judging whether the facilities having the lack or imperfection can be obtained from outside or can be newly constructed when there exists a route having a lack or imperfection in facilities; setting each imperfection of the route so that the facilities are obtained from outside when it is judged that the facilities can be obtained from outside based on a result of the judgment; setting each imperfection of the route so that the facilities are newly be constructed when it is judged that the facilities are newly be constructed; selecting, as a facilities supplement route, a route which can be completed as a route having no lack or imperfection in facilities on a route from the starting point to the end point by combining the imperfection of each route which is set such that the facilities are obtained from outside and the imperfection of each route which is set such that the facilities are newly constructed with each other to replenish the imperfection; verifying the selected route having no obstacle/limitation, the obstacle/limitation avoidable route, the selected facilities completion route and the facilities supplement route, and obtaining at least one route which can be completed from the starting point to the end point as at least one completion-possible route candidate; and calculates a route length, reliability and cost of the obtained at least one completion-possible route candidate, and determining an optimal route based on the calculated route length, reliability and cost. Therefore, it is possible to efficiently determine the optimal route including not only own facilities but also supplement from outside or facilities of new construction while avoiding obstacle/limitation and while taking a route length, reliability and cost into consideration, only by inputting the starting point and the end point of the route required by a customer.

Further, to achieve the above object, there is provided a communication conduit setting managing method for setting a communication conduit which accommodates a communication material between desired starting point and end point, comprising the steps of: accumulating and managing road network information as an road information database; accumulating and managing facilities information which is useful for setting a conduit as a facilities database together with auxiliary information including a place of facilities, a person-in-charge, and a facilities using condition; accumulating and managing names of obstacle and limitation ageist the setting of the conduit, as obstacle/limitation database, together with accessory information including contents of obstacle/limitation, a place, a period of time, and an avoiding condition of obstacle/limitation; accumulating and managing electronic map information as electronic map information database; referring to the road information database, the facilities database and the obstacle/limitation database, and retrieving at least one completion-possible route candidate capable of completing the starting point to the end point such that there is no lack or imperfection while including supplement of facilities or new construction on a route on a road connecting the starting point and the end point and there is no obstacle/limitation while including avoid of obstacle/limitation; calculating a route length, reliability and cost of the retrieved at least one completion-possible route candidate, and determining an optimal route based on the calculated route length, reliability and cost; and displaying the determined optimal route on the electronic map information extracted from the electronic map information database.

According to the present invention, it is possible to determine the optimal route, and to display the determined optimal route on the electronic map information. Therefore, the method becomes more convenient.

In a preferred embodiment of the present invention, the electronic map information extracted from the electronic map information database is converted, and the optimal route is displayed on the converted electronic map information.

According to this embodiment, it is possible to display the optimal route also on electronic map information of any coordinate system by converting coordinate system of electronic map information or file format. Therefore, even if coordinate system or file format supplied in the electronic map information from a customer company is different, it is possible to easily display the optimal route on any electronic map information by converting the electronic map information.

According to a preferred embodiment of the present invention, various data of the optimal route and various data used for determining the optimal route are accumulated in a historical information database as historical information and know-how information, and the various data is managed to be fed back for subsequent design.

According to this embodiment, various data of the optimal route and various data used for determining the optimal route are accumulated in the historical information database as historical information and know-how information, and they are managed such that they can be fed back for future design. Therefore, it is possible to more efficiently set the communication conduit by appropriately referring to the accumulated and managed historical information and know-how information.

Further, to achieve the above object, there is provided a communication conduit setting managing method in which a portion of a communication conduit setting managing program is supplied outside through a communication line, and a communication conduit can be set and managed at the same dimension as the outside.

According to the invention, a portion of the communication conduit setting managing program can be supplied to outside through a communication line such as the Internet, a LAN or the like by setting a period of time for example. With this, it is possible to easily set and manage a communication conduit at the same dimension as the outside.

In a preferred embodiment of the invention, the outside is an owner of facilities including another company, another group and public organization.

According to the embodiment, since with respect to facilities having lack or imperfection, a substituted facilities are obtained from outside such as an owner of facilities including another company, another group and public organization, it is possible to efficiently utilize the outside facilities.

To achieve the above object, there is provided a communication conduit setting managing system for setting a communication conduit which accommodates a communication material between desired starting point and end point, comprising: a road information database for accumulating and managing road network information; a facilities database for accumulating and managing facilities information which is useful for setting a conduit together with auxiliary information including a place of facilities, a person-in-charge, and a facilities using condition; obstacle/limitation database for accumulating and managing names of obstacle and limitation against the setting of the conduit together with accessory information including contents of obstacle/limitation, a place, a period of time, and an avoiding condition of obstacle/limitation; retrieving means for referring to the road information database, the facilities database and the obstacle/limitation database, thereby retrieving at least one completion-possible route candidate which can complete from the starting point to the end point such that there is no lack or imperfection in the facilities including supplement or new construction of facilities in a route on a road connecting between the starting point and the end point; and determining means for calculating a route length, reliability and cost of the retrieved at least one completion-possible route candidate, and determining an optimal route based on the calculated, route length, reliability and cost.

According to the invention, the system comprises retrieving means for referring to the road information database, the facilities database and the obstacle/limitation database, thereby retrieving at least one completion-possible route candidate which can complete from the starting point to the end point such that there is no lack or imperfection in the facilities including supplement or new construction of facilities in a route on a road connecting between the starting point and the end point; and means for calculating a route length, reliability and cost of the retrieved at least one completion-possible route candidate, and determining an optimal route based on the calculated, route length, reliability and cost. Therefore, it is possible to efficiently determine the optimal route including not only own facilities but also supplement from outside or facilities of new construction while avoiding obstacle/limitation and while taking a route length, reliability and cost into consideration, only by inputting the starting point and the end point of the route required by a customer.

Further, to achieve the above object, there is provided a communication conduit setting managing system for setting a communication conduit which accommodates a communication material between desired starting point and end point, comprising: a road information database for accumulating and managing road network information; a facilities database for accumulating and managing facilities information which is useful for setting a conduit together with auxiliary information including a place of facilities, a person-in-charge, and a facilities using condition; obstacle/limitation database for accumulating and managing names of obstacle and limitation against the setting of the conduit together with accessory information including contents of obstacle/limitation, a place, a period of time, and an avoiding condition of obstacle/limitation; inputting means for inputting place information of the starting point and the end point; route candidate retrieving means for retrieving a plurality of route candidates between the starting point and the end point on a road from the road information database based on the input place information of the starting point and the endpoint; obstacle/limitation status retrieving means for retrieving an obstacle/limitation status existing on a route in each of the route candidates; obstacle/limitation route judging means for judging whether there exists an obstacle/limitation in each of the routes from a result of this retrieval; route-with-no-obstacle/limitation selecting means for selecting a route in which there is no obstacle/limitation from a result of the judgement of the obstacle/limitation as a route having no obstacle/limitation; obstacle/limitation avoidance judging means for judging whether the obstacle/limitation can be avoided based on avoiding condition of obstacle/limitation when there exists a route having the obstacle/limitation from a result of the judgement of the obstacle/limitation; obstacle/limitation avoidable route judging means for selecting this route as a route capable of avoiding the obstacle/limitation when it was judged that the obstacle/limitation can be avoided from the result of the judgment; facilities status retrieving means for retrieving facilities status existing on the route in each of the plurality of route candidates from the facilities database; facilities imperfection judging means for judging whether there is a lack or imperfection in facilities in each of routes from a result of this retrieval; facilities completion route selecting means for selecting a route having no lack or imperfection in facilities from a result of judgement of this facilities as a facilities completion route; substitutive facilities judging means for judging whether the facilities having the lack or imperfection can be obtained from outside or can be newly constructed when there exists a route having a lack or imperfection in facilities from a result of the facilities; imperfection setting means for setting each imperfection of the route so that the facilities are obtained from outside when it is judged that the facilities can be obtained from outside based on a result of the judgment; new construction setting means for setting each imperfection of the route so that the facilities are newly be constructed when it is judged that the facilities are newly be constructed based on a result of the judgment; facilities supplement route selecting means for selecting, as a facilities supplement route, a route which can be completed as a route having no lack or imperfection in facilities on a route from the starting point to the end point by combining the imperfection of each route which is set such that the facilities are obtained from outside and the imperfection of each route which is set such that the facilities are newly constructed with each other to replenish the imperfection; completion-possible route candidate obtaining means for verifying the selected route having no obstacle/limitation, the obstacle/limitation avoidable route, the selected facilities completion route and the facilities supplement route, and obtaining a route which can be completed from the starting point to the end point as a completion-possible route candidate; and optimal route determining means for calculates a route length, reliability and cost of the obtained completion-possible route candidate, and determining an optimal route based on the calculated route length, reliability and cost.

According to the present invention, the system comprises route candidate retrieving means for retrieving a plurality of route candidates between the starting point and the end point on a road from the road information database based on the input place information of the starting point and the end point; obstacle/limitation status retrieving means for retrieving an obstacle/limitation status existing on a route in each of the route candidates; obstacle/limitation route judging means for judging whether there exists an obstacle/limitation in each of the routes from a result of this retrieval; route-with-no-obstacle/limitation selecting means for selecting a route in which there is no obstacle/limitation from a result of the judgement of the obstacle/limitation as a route having no obstacle/limitation; obstacle/limitation avoidance judging means for judging whether the obstacle/limitation can be avoided based on avoiding condition of obstacle/limitation when there exists a route having the obstacle/limitation from a result of the judgement of the obstacle/limitation; obstacle/limitation avoidable route judging means for selecting this route as a route capable of avoiding the obstacle/limitation when it was judged that the obstacle/limitation can be avoided from the result of the judgment; facilities status retrieving means for retrieving facilities status existing on the route in each of the plurality of route candidates from the facilities database; facilities imperfection judging means for judging whether there is a lack or imperfection in facilities in each of routes from a result of this retrieval; facilities completion route selecting means for selecting a route having no lack or imperfection in facilities from a result of judgement of this facilities as a facilities completion route; substitutive facilities judging means for judging whether the facilities having the lack or imperfection can be obtained from outside or can be newly constructed when there exists a route having a lack or imperfection in facilities from a result of the facilities; imperfection setting means for setting each imperfection of the route so that the facilities are obtained from outside when it is judged that the facilities can be obtained from outside based on a result of the judgment; new construction setting means for setting each imperfection of the route so that the facilities are newly be constructed when it is judged that the facilities are newly be constructed based on a result of the judgment; facilities supplement route selecting means for selecting, as a facilities supplement route, a route which can be completed as a route having no lack or imperfection in facilities on a route from the starting point to the end point by combining the imperfection of each route which is set such that the facilities are obtained from outside and the imperfection of each route which is set such that the facilities are newly constructed with each other to replenish the imperfection; completion-possible route candidate obtaining means for verifying the selected route having no obstacle/limitation, the obstacle/limitation avoidable route, the selected facilities completion route and the facilities supplement route, and obtaining a route which can be completed from the starting point to the end point as a completion-possible route candidate; and optimal route determining means for calculates a route length, reliability and cost of the obtained completion-possible route candidate, and determining an optimal route based on the calculated route length, reliability and cost. Therefore, it is possible to efficiently determine the optimal route including not only own facilities but also supplement from outside or facilities of new construction while avoiding obstacle/limitation and while taking a route length, reliability and cost into consideration, only by inputting the starting point and the end point of the route required by a customer.

According to a preferred embodiment of the invention, the communication conduit setting managing system further comprises an electronic map information database for accumulating and managing the electronic map information; and map converting means for converting the electronic map information extracted from the electronic map information database.

According to this embodiment, when the coordinate system of file format of the electronic map information extracted from the electronic map information database is different, the electronic map information is converted and optimal route can be displayed on the electronic map information. Therefore, the optimal route can be displayed on any type of electronic map information, and the system becomes more convenient.

In a preferred embodiment of the invention, the system further comprises a historical information database for accumulating various data of the optimal route and various data used for determining the optimal route as historical information and know-how information, and for managing the various data to be fed back for subsequent design.

According to this embodiment, various data of the optimal route and various data used for determining the optimal route are accumulated in the historical information database as historical information and know-how information, and they are managed such that they can be fed back for future design. Therefore, it is possible to more efficiently set the communication conduit by appropriately referring to the accumulated and managed historical information and know-how information.

In a preferred embodiment of the invention, the outside is an owner of facilities including another company, another group and public organization.

According to the embodiment, since with respect to facilities having lack or imperfection, a substituted facilities are obtained from outside such as an owner of facilities including another company, another group and public organization, it is possible to efficiently utilize the outside facilities.

To achieve the above object, there is provided a storing medium which stores therein a communication conduit setting managing program for setting a communication conduit which accommodates a communication material between desired starting point and endpoint, the program comprising the steps of: accumulating and managing road network information as an road information database; accumulating and managing facilities information which is useful for setting a conduit as a facilities database together with auxiliary information including a place of facilities, a person-in-charge, and a facilities using condition; accumulating and managing names of obstacle and limitation against the setting of the conduit, as obstacle/limitation database, together with accessory information including contents of obstacle/limitation, a place, a period of time, and an avoiding condition of obstacle/limitation; referring to the road information database, the facilities database, and the obstacle/limitation database, thereby retrieving at least one completion-possible route candidate which can complete from the starting point to the end point such that there is no lack or imperfection in the facilities including supplement or new construction of facilities in a route on a road connecting between the starting point and the end point; and calculating a route length, reliability and cost of the retrieved at least one completion-possible route candidate, and determining an optimal route based on the calculated, route length, reliability and cost.

According to the invention, the program comprises the steps of: referring to the road information database, the facilities database, and the obstacle/limitation database, thereby retrieving at least one completion-possible route candidate which can complete from the starting point to the end point such that there is no lack or imperfection in the facilities including supplement or new construction of facilities in a route on a road connecting between the starting point and the end point; and calculating a route length, reliability and cost of the retrieved at least one completion-possible route candidate, and determining an optimal route based on the calculated, route length, reliability and cost. Therefore, the storing medium can make the distribution of the methods enhanced.

Further, to achieve the above object, there is provided a storing medium which stores therein a communication conduit setting managing program for setting a communication conduit which accommodates a communication material between desired starting point and endpoint, the program comprising the steps of: accumulating and managing road network information as an road information database; accumulating and managing facilities information which is useful for setting a conduit as a facilities database together with auxiliary information including a place of facilities, a person-in-charge, and a facilities using condition; accumulating and managing names of obstacle and limitation against the setting of the conduit, as obstacle/limitation database, together with accessory information including contents of obstacle/limitation, a place, a period of time, and an avoiding condition of obstacle/limitation; inputting place information of the starting point and the end point; retrieving a plurality of route candidates between the starting point and the end point on a road from the road information database based on the input place information of the starting point and the end point; retrieving an obstacle/limitation status existing on a route in each of the route candidates; judging whether there exists obstacle/limitation in each of the routes from a result of this retrieval; selecting a route in which there is no obstacle/limitation from a result of the judgement of the obstacle/limitation as a route having no obstacle/limitation; judging whether an obstacle/limitation can be avoided based on avoiding condition of obstacle/limitation when there exists a route having the obstacle/limitation from a result of the judgement of the obstacle/limitation; selecting this route as a route capable of avoiding the obstacle/limitation when it was judged that the obstacle/limitation can be avoided from the result of the judgment; retrieving a facilities status existing on the route in each of the plurality of route candidates from the facilities database; judging whether there is a lack or imperfection in facilities in each of routes from a result of this retrieval; selecting a route having no lack or imperfection in facilities from a result of judgement of this facilities as a facilities completion route; judging whether the facilities having the lack or imperfection can be obtained from outside or can be newly constructed when there exists a route having a lack or imperfection in facilities from a result of the facilities; setting each imperfection of the route so that the facilities are obtained from outside when it is judged that the facilities can be obtained from outside based on a result of the judgment; setting each imperfection of the route so that the facilities are newly be constructed when it is judged that the facilities are newly be constructed based on a result of the judgment; selecting, as a facilities supplement route, a route which can be completed as a route having no lack or imperfection in facilities on a route from the starting point to the end point by combining the imperfection of each route which is set such that the facilities are obtained from outside and the imperfection of each route which is set such that the facilities are newly constructed with each other to replenish the imperfection; verifying the selected route having no obstacle/limitation, the obstacle/limitation avoidable route, the selected facilities completion route, and the facilities supplement route, and obtaining a route which can be completed from the starting point to the end point as a completion-possible route candidate; and calculates a route length, reliability and cost of the obtained completion-possible route candidate, and determining an optimal route based on the calculated route length, reliability and cost.

According to the invention, the program comprises the steps of: retrieving a plurality of route candidates between the starting point and the end point on a road from the road information database based on the input place information of the starting point and the end point; retrieving an obstacle/limitation status existing on a route in each of the route candidates; judging whether there exists an obstacle/limitation in each of the routes from a result of this retrieval; selecting a route in which there is no obstacle/limitation from a result of the judgement of the obstacle/limitation as a route having no obstacle/limitation; judging whether an obstacle/limitation can be avoided based on avoiding condition of obstacle/limitation when there exists a route having the obstacle/limitation from a result of the judgement of the obstacle/limitation; selecting this route as a route capable of avoiding the obstacle/limitation when it was judged that the obstacle/limitation can be avoided from the result of the judgment; retrieving a facilities status existing on the route in each of the plurality of route candidates from the facilities database; judging whether there is a lack or imperfection in facilities in each of routes from a result of this retrieval; selecting a route having no lack or imperfection in facilities from a result of judgement of this facilities as a facilities completion route; judging whether the facilities having the lack or imperfection can be obtained from outside or can be newly constructed when there exists a route having a lack or imperfection in facilities from a result of the facilities; setting each imperfection of the route so that the facilities are obtained from outside, when it is judged that the facilities can be obtained from outside based on a result of the judgment; setting each imperfection of the route so that the facilities are newly be constructed when it is judged that the facilities are newly be constructed based on a result of the judgment; selecting, as a facilities supplement route, a route which can be completed as a route having no lack or imperfection in facilities on a route from the starting point to the end point by combining the imperfection of each route which is set such that the facilities are obtained from outside and the imperfection of each route which is set such that the facilities are newly constructed with each other to replenish the imperfection; verifying the selected route having no obstacle/limitation, the obstacle/limitation avoidable route, the selected facilities completion route, and the facilities supplement route, and obtaining a route which can be completed from the starting point to the end point as a completion-possible route candidate; and calculates a route length, reliability and cost of the obtained completion-possible route candidate, and determining an optimal route based on the calculated route length, reliability and cost. Therefore, the storing medium can make the distribution of the methods enhanced.

In a preferred embodiment of the invention, various data of the optimal route and various data used for determining the optimal route are accumulated in a historical information database as historical information and know-how information, and the various data is managed to be fed back for subsequent design.

According to the embodiment, various data of the optimal route and various data used for determining the optimal route are accumulated in a historical information database as historical information and know-how information, and it is managed so that it is fed back for subsequent design. Therefore, the storing medium can make the distribution of the methods enhanced.

According to a preferred embodiment of the invention, the outside is an owner of facilities including another company, another group and public organization.

According to this embodiment, the communication conduit setting managing program for obtaining facilities having lack or imperfection from outside such as owner of facilities including another company, another group and public organization is provided. Therefore, the storing medium can make the distribution of the methods enhanced.

To achieve the above object, there is provided a communication conduit maintenance managing method at the time of maintenance and management of a communication conduit which accommodates a communication material, comprising the steps of: accumulating and managing road network information as an road information database; accumulating and managing facilities information which is useful for setting a conduit as a facilities database together with auxiliary information including a place of facilities, a person-in-charge, and a facilities using condition; accumulating and managing names of obstacle and limitation against the setting of the conduit, as obstacle/limitation database, together with accessory information including contents of obstacle/limitation, a place, a period of time, and an avoiding condition of obstacle/limitation; appropriately renewing the road information database, the facilities database, and the obstacle/limitation database, and carrying out maintenance and management of the existing communication conduit while referring to these databases.

According to this invention, the road information database accumulating and managing the road network information; facilities database accumulating and managing facilities information which is useful for setting the conduit together with the auxiliary information including a place of facilities, a person-in-charge, and a facilities using condition; and obstacle/limitation database accumulating and managing names of the obstacle and limitation against the setting of the conduit, together with the accessory information including the contents of obstacle/limitation, a place, period of time, and an avoiding condition of obstacle/limitation; are appropriately renewed. Therefore, it is possible to easily and reliably carry out the maintenance and management of the existing communication conduit by referring to these databases.

Further, to achieve the above object, there is provided a communication conduit maintenance managing method at the time of maintenance and management of a communication conduit which accommodates a communication material, comprising the steps of: accumulating and managing road network information as an road information database; accumulating and managing facilities information which is useful for setting a conduit as a facilities database together with auxiliary information including a place of facilities, a person-in-charge, and a facilities using condition; accumulating and managing names of obstacle and limitation against the setting of the conduit, as obstacle/limitation database, together with accessory information including contents of obstacle/limitation, a place, a period of time, and an avoiding condition of obstacle/limitation; accumulating and managing electronic map information as an electronic map information database; and appropriately renewing the road information database, the facilities database, the obstacle/limitation database, and the electronic map information database, and carrying out maintenance and management of the existing communication conduit while referring to these databases.

According to the invention, the electronic map information is renewed, and the maintenance and management of the existing communication conduit can be carried out while referring to the latest databases on the renewed electronic map information and thus, it is possible to easily and reliably carry out the maintenance and management.

According to a preferred embodiment of the invention, when a style of the electronic map information is different, the electronic map information is converted, the converted electronic map information is accumulated and managed in the electronic map information database, and maintenance and management of the existing communication conduit are carried out.

According to this embodiment, when the coordinate system of file format of the electronic map information extracted from the electronic map information database is different, the electronic map information is converted and optimal route can be displayed on the electronic map information. Therefore, the optimal route can be displayed on any type of electronic map information, and the method becomes more convenient.

Further, to achieve the above object, there is provided a communication conduit maintenance managing method in which a portion of a communication conduit setting managing program is supplied outside through a communication line, and a communication conduit can be set and managed at the same dimension as the outside.

According to the invention, a portion of the communication conduit setting managing program can be supplied to outside through a communication line such as the Internet, a LAN or the like by setting a period of time for example. With this, it is possible to easily set and manage a communication conduit at the same dimension as the outside.

Further, to achieve the above object, there is provided a communication conduit maintenance managing system for carrying out maintenance and management of a communication conduit which accommodates a communication material, comprising: a road information database for accumulating and managing road network information; a facilities database for accumulating and managing facilities information which is useful for setting a conduit together with auxiliary information including a place of facilities, a person-in-charge, and a facilities using condition; an obstacle/limitation database for accumulating and managing names of obstacle and limitation against the setting of the conduit together with accessory information including contents of obstacle/limitation, a place, a period of time, and an avoiding condition of obstacle/limitation; and maintenance and managing means which appropriately renews the road information database, the facilities database, and the obstacle/limitation database, and carrying out maintenance and management of the existing communication conduit while referring to these databases.

According to this invention, the road information database accumulating and managing the road network information; the facilities database accumulating and managing facilities information which is useful for setting the conduit together with the auxiliary information including a place of facilities, a person-in-charge, and a facilities using condition; and the obstacle/limitation database accumulating and managing names of the obstacle and limitation against the setting of the conduit together with the accessory information including the contents of obstacle/limitation, a place, a period of time, and an avoiding condition of obstacle/limitation; are appropriately renewed. Therefore, it is possible to easily and reliably carry out the maintenance and management of the existing communication conduit by referring to these databases.

Further, to achieve the above object, there is provided a communication conduit maintenance managing system used when maintenance and management of a communication conduit which accommodates a communication material are carried out, comprising: a road information database for accumulating and managing road network information; a facilities database for accumulating and managing facilities information which is useful for setting a conduit together with auxiliary information including a place of facilities, a person-in-charge, and a facilities using condition; an obstacle/limitation database for accumulating and managing names of obstacle and limitation against the setting of the conduit together with accessory information including contents of obstacle/limitation, a place, a period of time, and an avoiding condition of obstacle/limitation; an electronic map information database for accumulating and managing electronic map information; map converting means for converting the electronic map information extracted from the electronic map information database; and maintenance and managing means which appropriately renews the road information database, the facilities database, the obstacle/limitation database, and the electronic map information database, and carries out maintenance and management of the existing communication conduit while referring to these databases.

According to the invention, it is possible to easily and reliably carry out the maintenance and management of the existing communication conduit.

Further, to achieve the above object, there is provided a storing medium storing a communication conduit maintenance managing program used when maintenance and management of a communication conduit which accommodates a communication material are carried out, the program comprising the steps of: accumulating and managing road network information as an road information database; accumulating and managing facilities information which is useful for setting a conduit as a facilities database together with auxiliary information including a place of facilities, a person-in-charge, and a facilities using condition; accumulating and managing names of obstacle and limitation against the setting of the conduit, as obstacle/limitation database, together with accessory information including contents of obstacle/limitation, a place, a period of time, and an avoiding condition of obstacle/limitation; and appropriately renewing the road information database, the facilities database, and the obstacle/limitation database, and carrying out maintenance and management of the existing communication conduit while referring to these databases.

According to this invention, the road information database accumulating and managing the road network information; the facilities database accumulating and managing facilities information which is useful for setting the conduit together with the auxiliary information including a place of facilities, a person-in-charge, and a facilities using condition; and the obstacle/limitation database accumulating and managing names of the obstacle and limitation against the setting of the conduit together with the accessory information including the contents of obstacle/limitation, a place, a period of time, and an avoiding condition of obstacle/limitation; are appropriately renewed. Therefore, it is possible to widely distribute the communication conduit maintenance managing program which can easily and reliably carry out the maintenance and management of the existing communication conduit by referring to these databases.

To achieve the above object, there is provided a storing medium storing a communication conduit maintenance managing program used when maintenance and management of a communication conduit which accommodates a communication material are carried out, the program comprising the steps of: accumulating and managing road network information as an road information database; accumulating and managing facilities information which is useful for setting a conduit as a facilities database together with auxiliary information including a place of facilities, a person-in-charge, and a facilities using condition; accumulating and managing names of obstacle and limitation against the setting of the conduit, as obstacle/limitation database, together with accessory information including contents of obstacle/limitation, a place, a period of time, and an avoiding condition of obstacle/limitation; accumulating and managing electronic map information as an electronic map information database; and appropriately renewing the road information database, the facilities database, the obstacle/limitation database, and the electronic map information database, and carrying out maintenance and management of the existing communication conduit while referring to these databases.

According to the invention, it is possible to widely distribute the communication conduit maintenance managing program which can easily and reliably carry out the maintenance and management of the existing communication conduit by referring to these databases.

To achieve the above object, there is provided a communication conduit managing system which is connected to an optical monitoring system for monitoring an optical cable accommodated in a communication conduit while testing the same and for detecting abnormal condition of the optical cable through a network, which collects core information of the cable from the optical monitoring system, and which carries out setting, maintenance and management of the conduit which accommodates a communication material, comprising: cable information collecting means for obtaining cable core information and cable abnormal condition information of the optical cable from the optical monitoring system; map information obtaining means for obtaining map information at an abnormal condition generated point where the cable abnormal condition information is generated; and alarm sending means for sending, as an alarm, map information indicative of this obtained abnormal condition generated point together with the cable abnormal condition information, to a terminal including a cellular phone of a person in charge of maintenance.

According to the invention, the optical cable accommodated in the communication conduit is monitored while testing the same, and if cable abnormal condition information is collected from the optical monitoring system which detects the abnormal condition information of the optical cable, the communication conduit managing system obtains the map information at a point where the abnormal condition is generated, and the map information indicative of the abnormal condition generated point together with the cable abnormal condition information is sent to the terminal including the cellular phone of the person in charge of maintenance as the alarm mail. Therefore, when the abnormal condition is generated in the optical cable, the person in charge of maintenance immediately receives the abnormal condition information of the optical cable together with the map information indicative of the abnormal condition generated point through the terminal such as the cellular phone of his or her own, and the person-in-charge can swiftly take necessary procedure for the abnormal condition of the optical cable, and the person-in-charge can refer to the core information of the cable at the same dimension as other facilities information by triple IP, and it is possible to reliably take necessary recovery procedure.

The nature, principle and utility of the invention will become more apparent from the following detailed description when read in conjunction with the accompanying drawing.

BRIEF DESCRIPTION OF THE DRAWINGS

In the accompanying drawings:

FIG. 1A shows a structure of a system carrying out a communication conduit setting managing method according to an embodiment of the present invention;

DESCRIPTION OF THE PREFERRED EMBODIMENTS

Embodiments of the present invention will be explained with reference to the drawings. FIG. 1A shows a communication conduit setting managing method according to an embodiment of the invention, and a system for carrying out a communication conduit maintenance managing method.

Figure 1B:
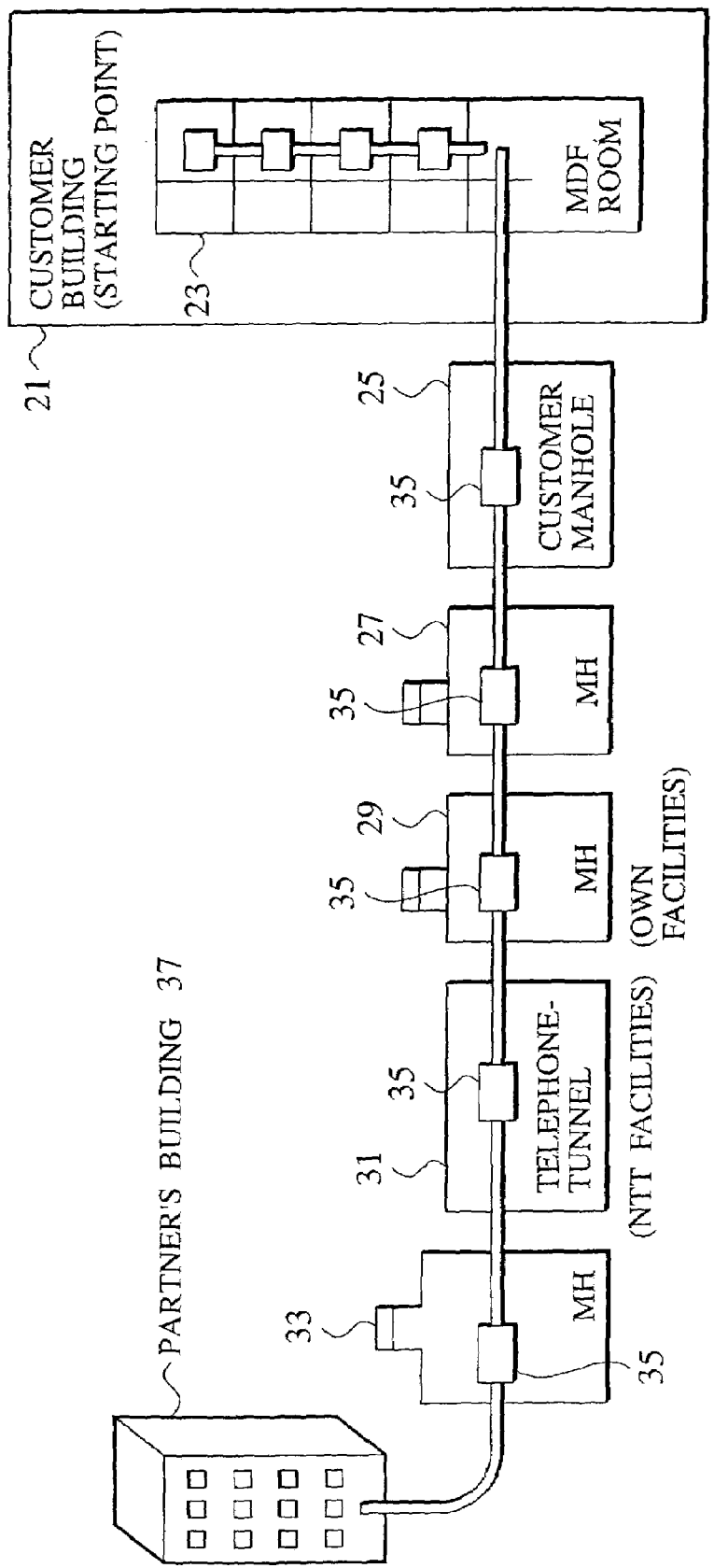
FIG. 1B is an explanatory view showing a route from a starting point to an end point.

A communication conduit managing system 1 shown in FIG. 1A includes a communication conduit setting system and a communication conduit maintenance system, and respective managing servers therefor may separately be provided, or the systems may be constructed in the same managing server. The communication conduit managing system 1 is connected to a customer company 13 through the Internet 9. As shown in FIG. 1B, the communication conduit for accommodating a cable including the optical fiber is set in a route between a starting point of a customer building 21 to an end point of a partner's building 37 utilizing an existing customer handhole (HH) 25, an own hanhole (HH) 27, an own manhole (MH) 29, a telephone-tunnel 31 of facilities of a telecommunication company, a manhole (MH) 33 or the like, or the communication conduit is buried by new construction if necessary, or the communication conduit is obtained from another company and is set, and the system accumulates and manages data of this set route and various data used for setting the route. In FIG. 1B, a closure 35 provided in the manhole 33 from the customer handhole 25 is used for connecting a cable therein or for branching.

That is, the communication conduit managing system 1 of this embodiment sets a rote of the communication conduit from the starting point to the end point appropriately while swiftly meeting requirements from the customer company 13 while utilizing not only the communication conduit such as the handhole (HH), the manhole (MH) and the telephone-tunnel, but also customer's own facilities such as a communication conduit and a cable for a customer route owned by the customer company 13, and a communication conduit and a cable owned by other companies such as a telephone company, an electricity-generating company, and a railroad company, and public facilities such as a communication conduit owned by a public office 11. When these cannot be utilized, a communication conduit is buried by a new construction to set a route.

The communication conduit managing system 1 shown in FIG. 1A which freely sets the communication conduit comprises: a road information database 3 for accumulating and managing road information; a facilities database 5 for accumulating and managing the facilities information which is useful for setting the conduit together with auxiliary information including the facilities place, the person-in-charge and facilities using condition; an environment database 7 constituting obstacle/limitation database for accumulating and managing names of limitation and obstacle to the setting of the conduit together with accessory information including content of obstacle/limitation, place, period of time, and avoiding condition of obstacle/limitation; and a knowledge database 8 constituting a route setting information database for accumulating and managing data of the conduit set by requirement from a customer and various data used for setting the conduit. The communication conduit managing system 1 is connected to the public office 11 and the customer company 13 through the Internet 9. The public office 11 and the customer company 13 can appropriately obtain various information and progress state of the own facilities through the Internet 9.

Next, the operation of the communication conduit managing system 1 of the embodiment shown in FIG. 1A will be explained with reference to a flowchart shown in FIG. 2. An operation of a case in which facilities including a communication conduit is provided on a route from the starting point of the customer building 21 to the end point of the partner's building 37 as shown in FIG. 1B desired by a customer according to requirement from the customer company 13 through the Internet 9 will be explained.

If the communication conduit managing system 1 of the embodiment receives place information of the starting point of the customer building 21 and the end point of the partner's building 37 designated from the customer company 13 (step S11), the communication conduit managing system 1 retrieves candidates of route on a road connecting the starting point and the end point based on the place information of the starting point and the end point (step S13).

Figure 3:
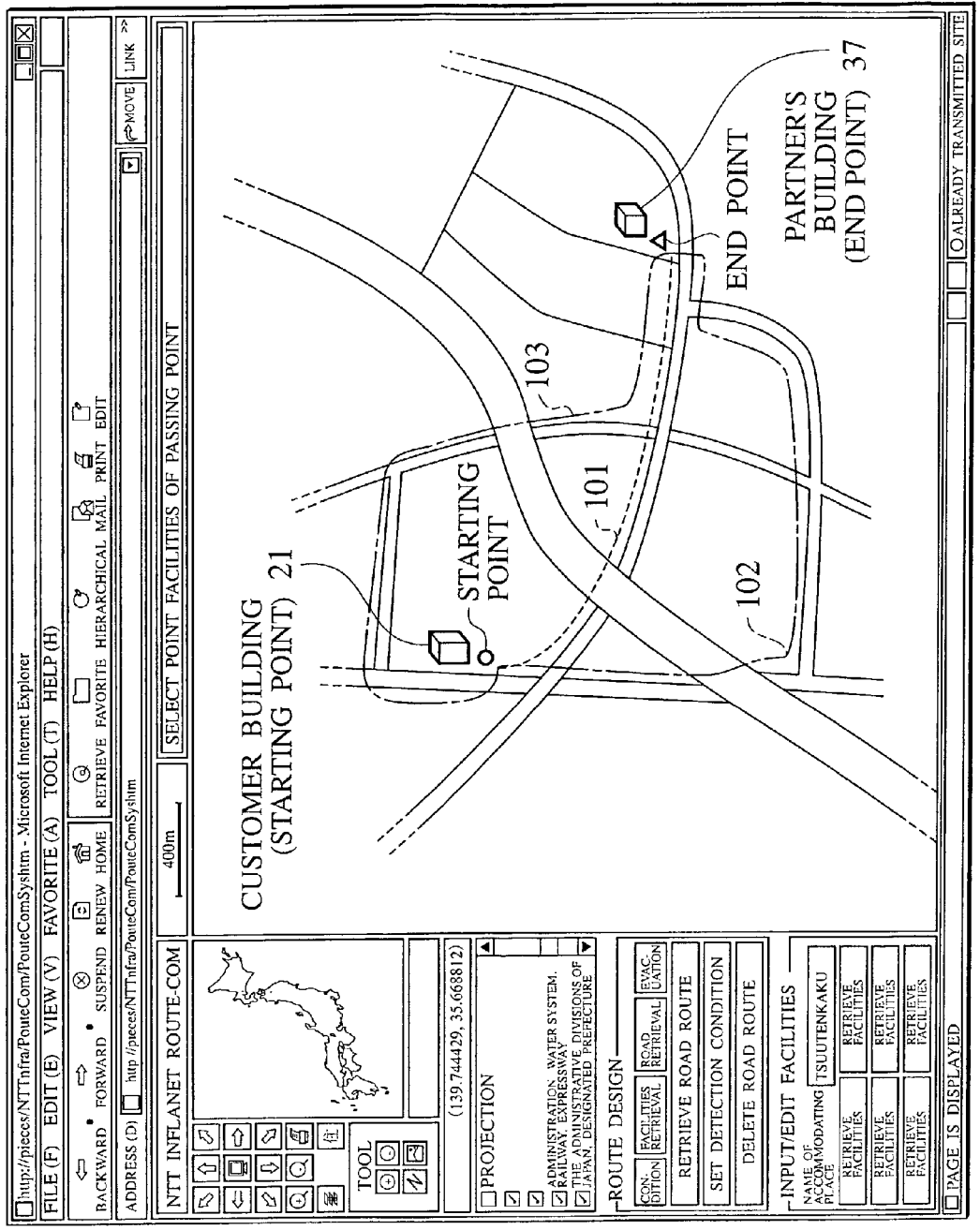
FIG. 3 shows a plurality of routes between a starting point and an end point on a road map displayed on a display screen of the communication conduit managing system shown in FIG. 1A.

As a result of this retrieval, a plurality of routes 101, 102, 103 are displayed on a display screen of this system. In FIG. 3, the road information database 3 is retrieved while defining a place where the customer building 21 exists as "starting point" and a place where the partner's building 37 exists as "end point", and as a result of the retrieval, the three routes 101, 102 and 103 respectively shown with thick dotted line, dashed line and two-dot chain line were detected.

The retrieved plurality of routes 101, 102 and 103 were merely detected from the road information database 3, and facilities of some of the communication conduits can not be set because facilities such as a communication conduit for accommodating the cable is lacking on the route, or there is imperfection in facilities and the facilities can not be used as it is, or there is obstacle/limitation such as a relatively long term construction such as a road heating which is a snow-melting heater. Therefore, it is necessary to judge whether which route has perfect facilities, or whether there is obstacle/limitation, or whether it is possible to borrow another facilities when the own facilities has imperfection, or whether it is necessary to carry out new construction, or whether it is possible to avoid the obstacle/limitation when there is obstacle/limitation, thereby setting a plurality of route candidates capable of completing from the starting point to the end point.

Here, in this embodiment, the obstacle/limitation status in each route of the plurality of route candidates retrieved from the road information database 3 described above is retrieved (step S15), and the facilities status in each route of the plurality of route candidates is retrieved from the facilities database 5 (step S25).

From a result of retrieval of the obstacle/limitation status in step S15, it is judged whether there exists a route having the obstacle/limitation (step S17). As a result of this judgement, when there exists the route having no obstacle/limitation, this route is selected as a route having no obstacle/limitation (step S18).

If there exists a route having the obstacle/limitation as the result of the judgement of step S17, contents and route of the obstacle/limitation are specified from the environment database 7 (step S19), it is judged whether this obstacle/limitation can be avoided with any condition based on the avoiding condition of obstacle/limitation of the environment database 7 (step S21). If the obstacle/limitation cannot be avoided as a result of the judgement, this route is output as impossible route (step S23), but if the obstacle/limitation can be avoided, this route is selected as obstacle/limitation avoidable route (step S22).

On the other hand, it is judged whether there is a route having imperfection in facilities from the result of retrieval of the facilities status in step S25 (step S27). If there exists a route having not imperfection in facilities, i.e., a route in which facilities has already been completed, this route is selected as a facilities completion route (step S29).

If there exists a route having imperfection in facilities as the result of judgement in step S27, contents and route of the imperfection of this facilities are specified (step S31), and then it is judged whether the facilities having the imperfection can be obtained from outside including other facilities and public facilities, and it is judged whether the facilities having the imperfection can be obtained by new construction (step S33). If it is impossible to obtain the facilities from outside or to obtain the facilities by new construction, this route is output as impossible route (step S35).

However, if it is possible to obtain the facilities having imperfection from outside including other facilities and public facilities or it is possible to obtain the same by new construction, it is set such that the facilities having imperfection is to be obtained from outside or by new construction (step S37), and this route is selected as facilities supplement route (step S38).

Next, the route having the above selected obstacle/limitation (step S18), the obstacle/limitation avoidable route (step S22), the facilities completion route (step S29), and the facilities supplement route (step S38) are checked, and a route which can complete from the starting point to the end point is obtained as completion-possible route candidate (step S39) as a result of the check.

Then, a route length of each of the obtained completion-possible route candidates is calculated (step S41), reliability of each the completion-possible route candidates is calculated (step S43), and costs including initial cost and running cost of each the completion-possible route candidate is calculated (step S45).

Then, the optimal route is determined based on the route length, the reliability and cost of the calculated completion-possible route candidate (step S47), this determined optimal route is displayed on the digital map shown in FIG. 3 together with the facilities information and obstacle/limitation information, and this information is informed of the customer company 13 through the Internet 9, data of the route and various data used for setting the route are accumulated and managed in the knowledge database 8 as historical data and know-how information (step S51), and the data can be utilized for managing and referring for setting the future route.

Figure 4:
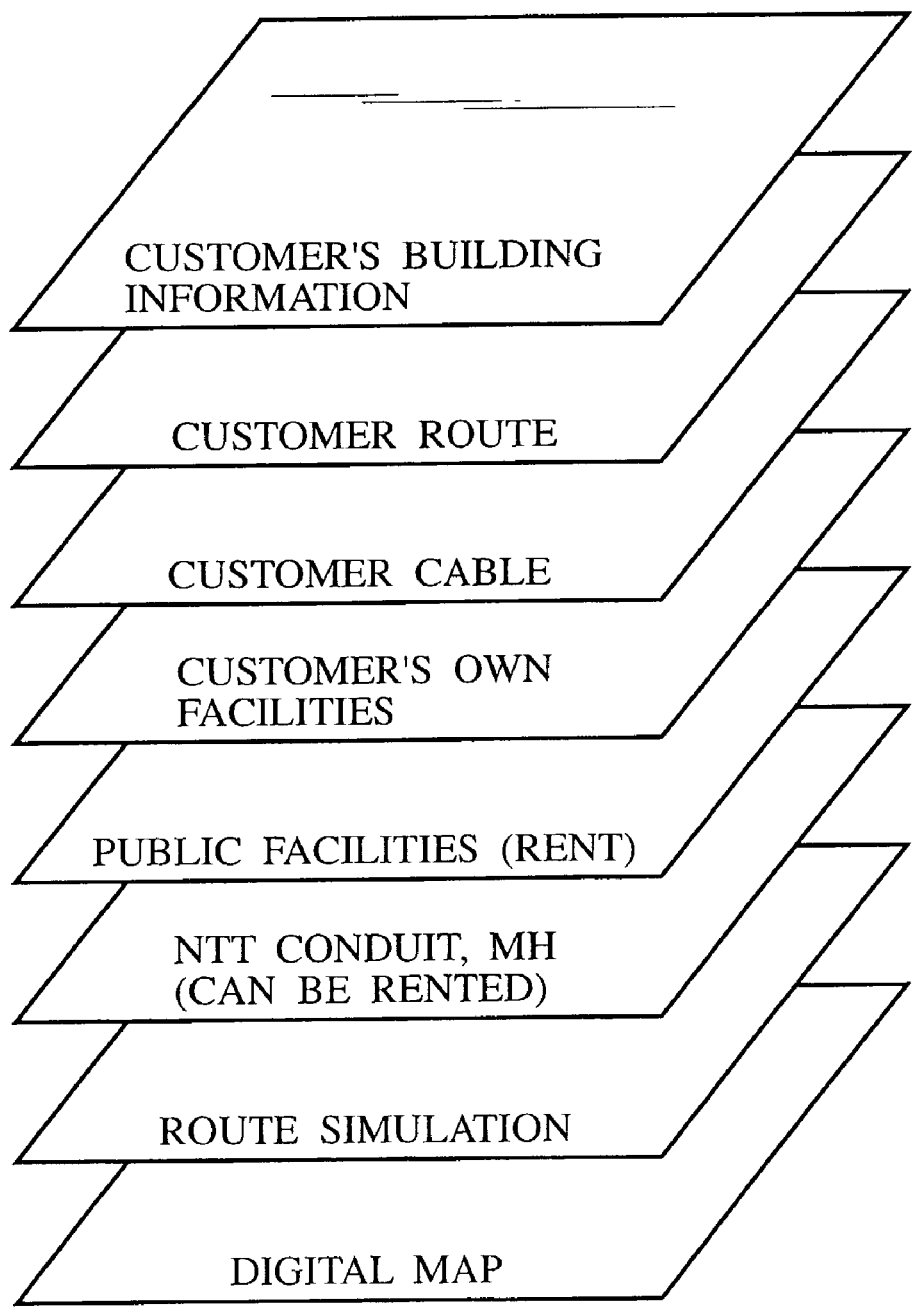
FIG. 4 is an explanatory view showing hierarchical facilities information of the communication conduit managing system shown in FIG. 1A.

The facilities information such as the communication conduit used in the above-described embodiment, i.e., underground space facilities information is layered in a hierarchical manner so that optimal route can efficiently be determined as described above. This hierarchical structure is layered in the hierarchical manner into customer building information, customer route, customer cable, customer own facilities, public facilities, NTT conduit and manhole as shown in FIG. 4. Each hierarchical layer is appropriately divided and managed dependent upon customers, and types of facilities.

Simulation is carried out from the hierarchically layered data, and the optimal route which was determined as described above is displayed on the digital map together with the facilities information and the obstacle/limitation information, and it is informed of the customer company 13 through the Internet 9.

Figure 2:
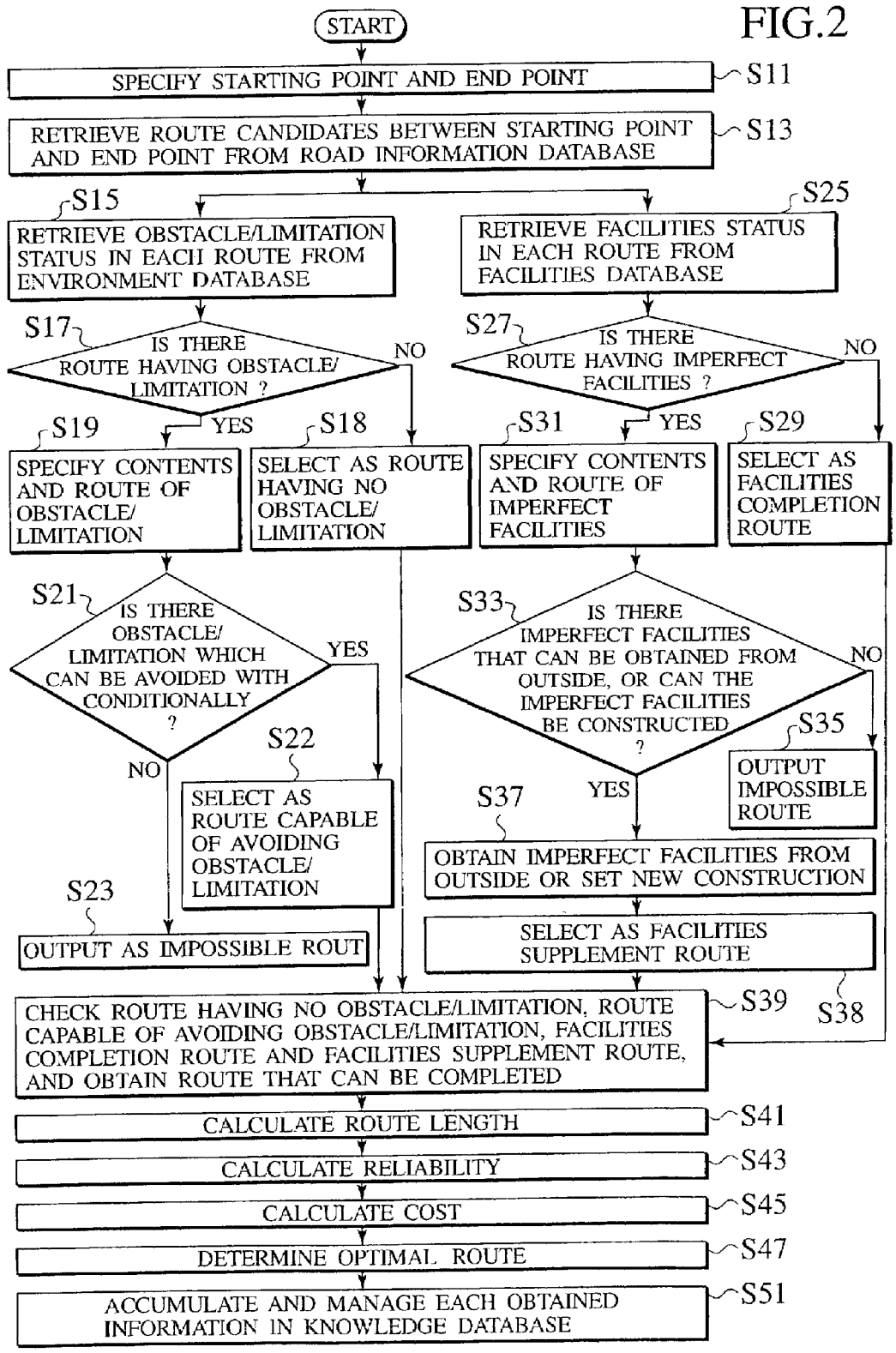
FIG. 2 is a flowchart showing an operation of a communication conduit managing system shown in FIG. 1A.

The reliability calculated in step S43 in FIG. 2 is calculated from quakeproof reliability, floods dangerous degree, ground dangerous degree, deterioration degree and the like. Relative rank is determined with respect to each of these factors, and the reliability is determined by a total of the ranks. The ranks are calculated for each of the route candidates.

Next, outline of the communication conduit managing system to which the communication conduit setting managing method of this invention will be explained with reference to FIG. 5.

Figure 5:
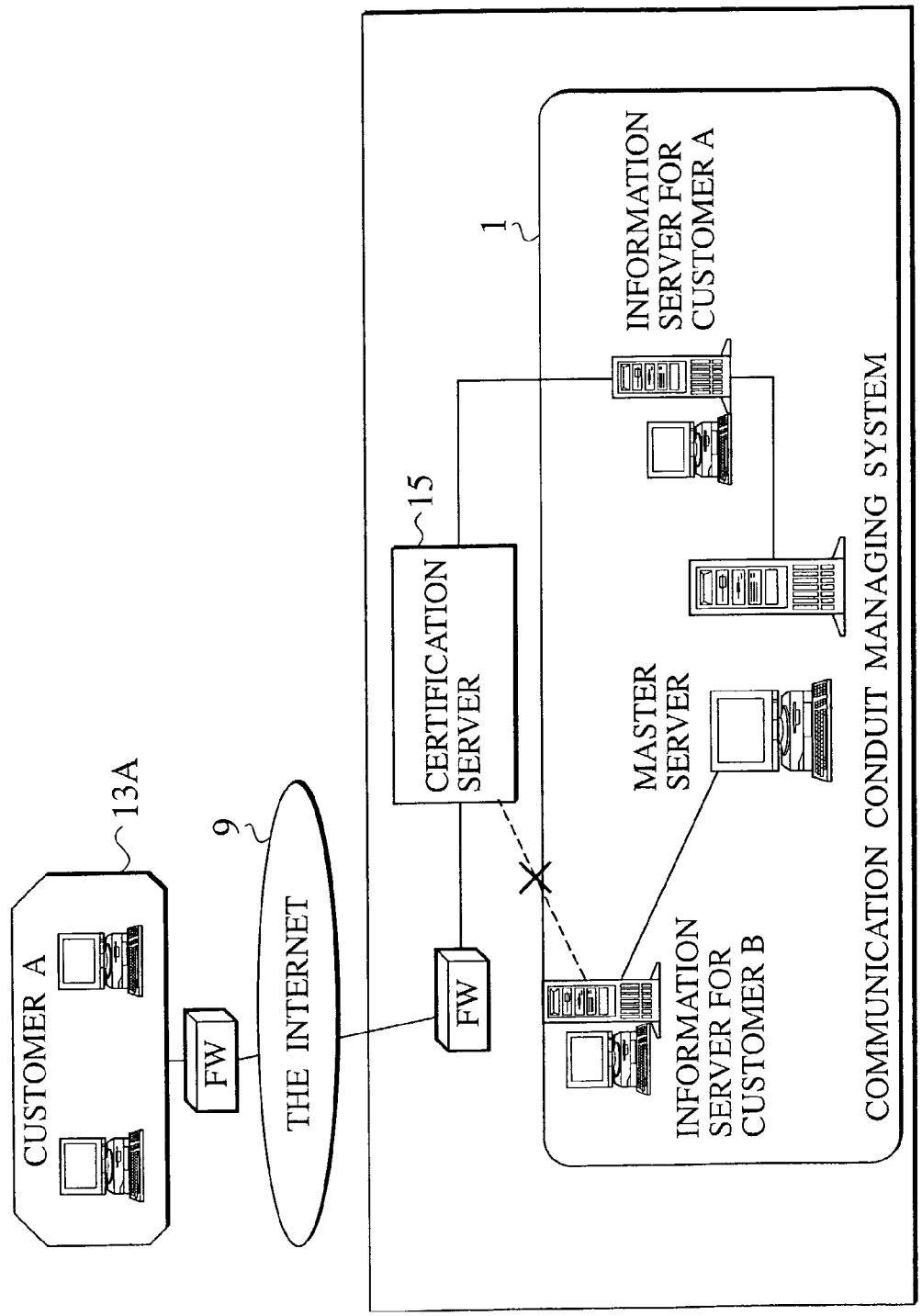
FIG. 5 is a block diagram showing a structure of a communication conduit maintenance managing system.

First, in FIG. 5, a server of a customer 13A is connected to the communication conduit managing system 1 which carries out the setting and managing operation and the maintenance and managing operation in the embodiment through a customer's firewall FW, the Internet 9, the system's firewall, a certification server 15 and the like.

A plurality of customer information servers corresponding to the plurality of customers and a master server for collectively managing these customer information servers are constituted in the communication conduit managing system 1. In this constitution, the customer information servers may physically constituted independently, or the customer information servers may be constituted in the same server, e.g., in the master server.

First, when the communication conduit managing system 1 is accessed from a customer 13A, it is certified in the certification server 15. If it is proper, the access to the information server for a customer A is admitted. That is, access to an information server for a customer B is rejected. Therefore, the customer 13A can not read information other than that which is laid-open for public, i.e., information for the customer B, or can not even know the existence of the customer B.

The master server manages the customer A information server, the customer B information server, . . . , and manages the contents of the information accumulated in the servers so that when accident is generated in the conduit or communication itself, the master server can swiftly grasp the source status of each customer, and can flexibly react mutually, and can carry out maintenance.

When an already buried communication conduit is utilized, it is possible to smoothly check the utilizable status of the communication conduit owned by a certain company, request for utilization, make a plan of construction of own communication conduit after the response to the request, design and construct. With this, it is possible to reduce the enormous amounts of time and operation which are conventionally required for setting and maintenance and management of optimal route.

Next, referring to FIGS. 6 and 7, a communication conduit managing system according to another embodiment of the invention will be explained. According to the communication conduit managing system of this embodiment, abnormal condition information of the optical cable is sent to a terminal including a cellular phone of a person in charge of maintenance as an alarm mail, thereby swiftly handling with the abnormal condition of the optical cable.

According to the communication conduit managing system of this embodiment, the optical cable accommodated in the communication conduit is monitored while testing the same, the communication conduit managing system is connected to an optical monitoring system which detects abnormal condition information of the optical cable through a network, and the communication conduit managing system carries out the setting, maintenance and management of the conduit which accommodates the communication materials. The communication conduit managing system obtains the abnormal condition information of the optical cable from the optical monitoring system, more specifically, the cable abnormal condition information including the cable core information, and sends the abnormal condition information of this optical cable to the terminal including the cellular phone of the person in charge of maintenance as an alarm mail. When the abnormal condition is generated in the optical cable, the system immediately sends the abnormal condition information including the core information of the optical cable to the cellular phone of the person in charge of maintenance together with the map information indicative of a point where the abnormal condition is generated, so that the person in charge of maintenance can swiftly handle the abnormal condition of the optical cable.

Figure 6:
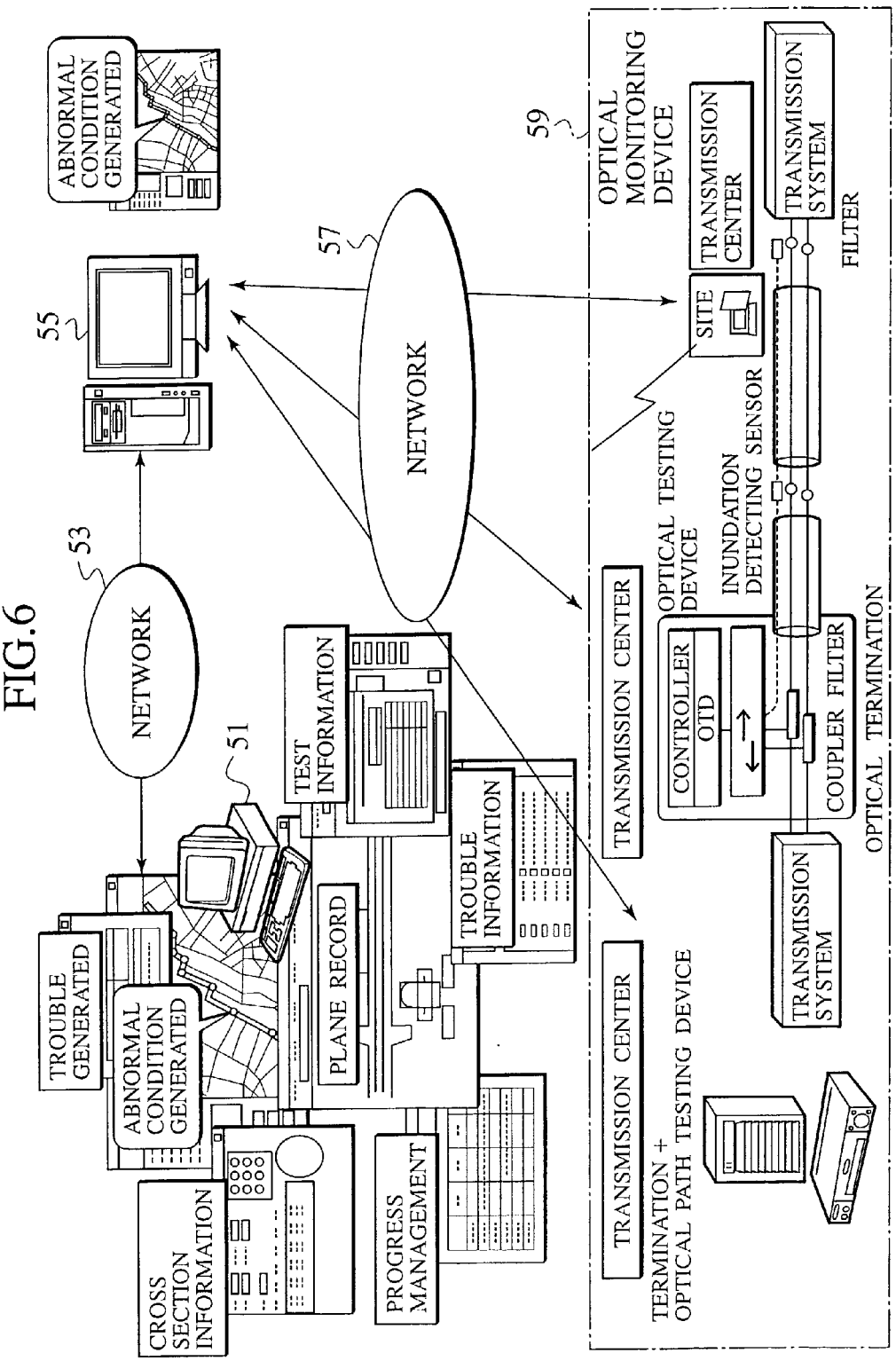
FIG. 6 shows a structure of a communication conduit managing system according to another embodiment of the invention.

More specifically, as shown in FIG. 6, the communication conduit managing system 51 of this embodiment is connected to a managing device 55 which constitutes a portion of an optical managing system through a network 53 which is a high speed backbone, and the managing device 55 is connected to an optical monitoring device 59 through a network 57 such as a LAN or a telephone line. The managing device 55, the network 57 and the optical monitoring device 59 constitute the optical monitoring system.

As explained in the embodiment shown in FIG. 1, the communication conduit managing system 51 carries out the setting, maintenance and management operations of the conduit which accommodates the communication materials, and processes trouble information, map information indicative of a point where abnormal condition is generated, cross section information, progress management, plant record, test information and the like as shown in the display screen around the communication conduit managing system 51 in FIG. 6.

The optical monitoring device 59 which forms a center of the optical monitoring system monitors the optical cable accommodated in the communication conduit while testing the same, and detects abnormal condition of the optical cable. The optical monitoring device 59 is connected to the managing device 55 through the network 57 from a transmission center as shown in FIG. 6. As shown in FIG. 6, the optical monitoring device 59 monitors the state of the optical cable which connects the transmission systems, and detects the abnormal condition of the optical cable. The detected abnormal condition of the optical cable is collected by the managing device 55.

Figure 7:
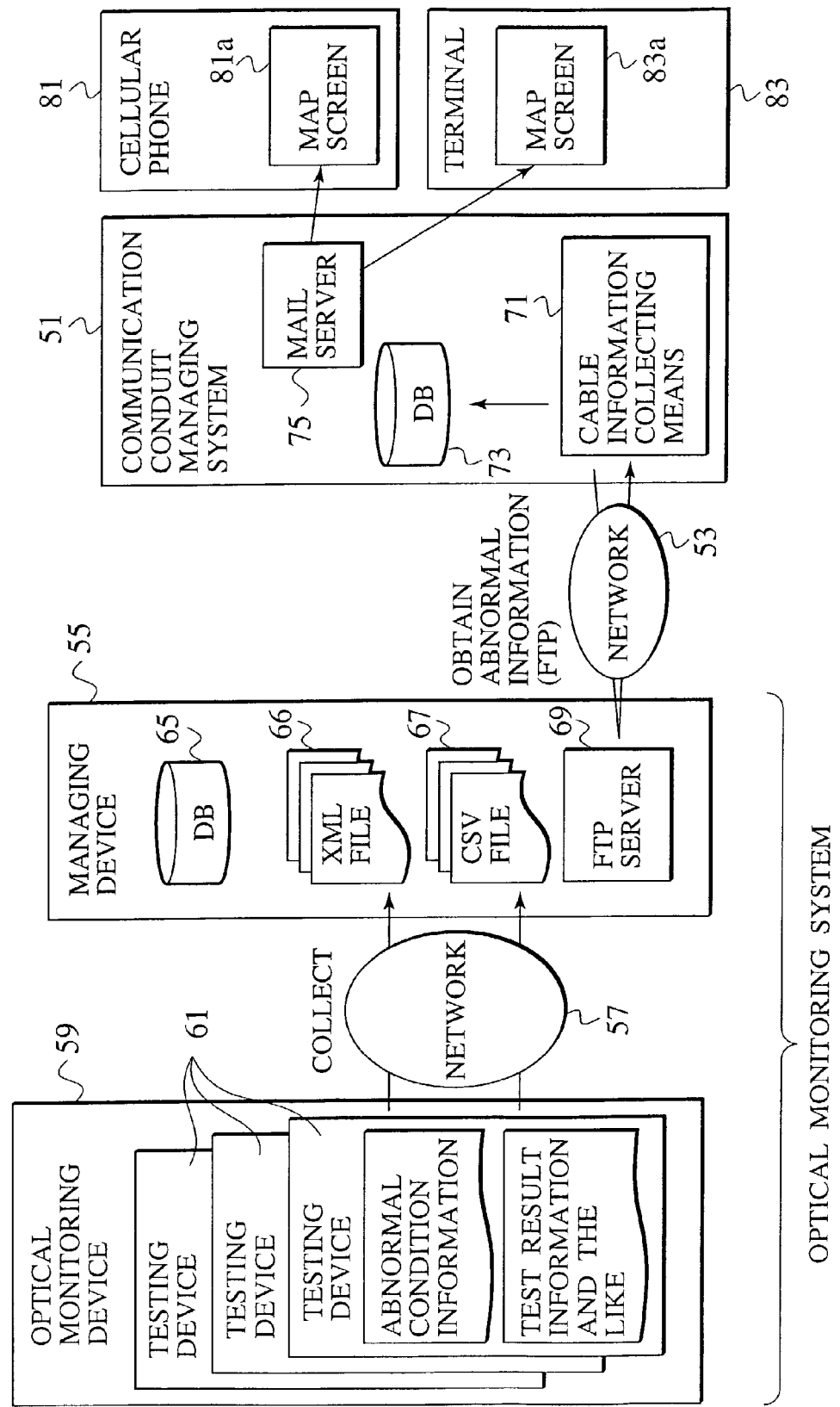
FIG. 7 is a block diagram showing a detailed structure of the communication conduit managing system of the embodiment shown in FIG. 6.

More specifically, as shown in FIG. 7, the optical monitoring device 59 includes a testing device 61 which tests the optical cable using optical pulse for example at constant intervals and monitors the same, detects the abnormal condition of the optical cable, and carries out maintenance of abnormal condition information of the cable including the cable core information and test result information. The managing device 55 collects the abnormal condition information of the optical cable from the optical monitoring device 59, forms XML file 66 and CSV file 67, and store the same in a database (DB) 65, and is connected to the communication conduit managing system 51 through an FTP server 69.

Further, the communication conduit managing system 51 includes a cable information collecting means 71 which obtains cable core information including cable abnormal condition information from the managing device 55 through the network 53, the system 51 stores the core information obtained by the cable information collecting means 71 in a database (DB) 73, obtains map information indicative of a point where the abnormal condition is generated from the database 73 based on the core information, and sends the map information indicative of the point where the abnormal condition is generated to a cellular phone 81 or a terminal 83 of the person in charge of maintenance directly or through a mail server 75 as an alarm, e.g., an alarm mail. As a result, a map screen 81a or 83a indicative of the point where the abnormal condition is generated is displayed on the cellular phone 81 or the terminal 83 of the person in charge of maintenance together with cable core information including the cable abnormal condition information. As a result, the person in charge of maintenance can swiftly handle the abnormal condition state of the optical cable. Especially, as the abnormal condition information of the optical cable, the cable core information can be referred to at the same dimension as the other facilities information by the triple IP, and it is possible to properly identify which core has the abnormal condition, and to reliably recover the abnormal condition.

SECOND EMBODIMENT (FIG. 8)

In this embodiment, a communication conduit managing system which displays an optimal route determined by the communication conduit setting managing method shown in the first embodiment on a digital map, and realizes maintenance and management on the electronic map will be explained using FIG. 8. Since a structure of this communication conduit managing system is substantially the same as the communication conduit managing system shown in the first embodiment, explanation of the same portion will be omitted.

Figure 8:
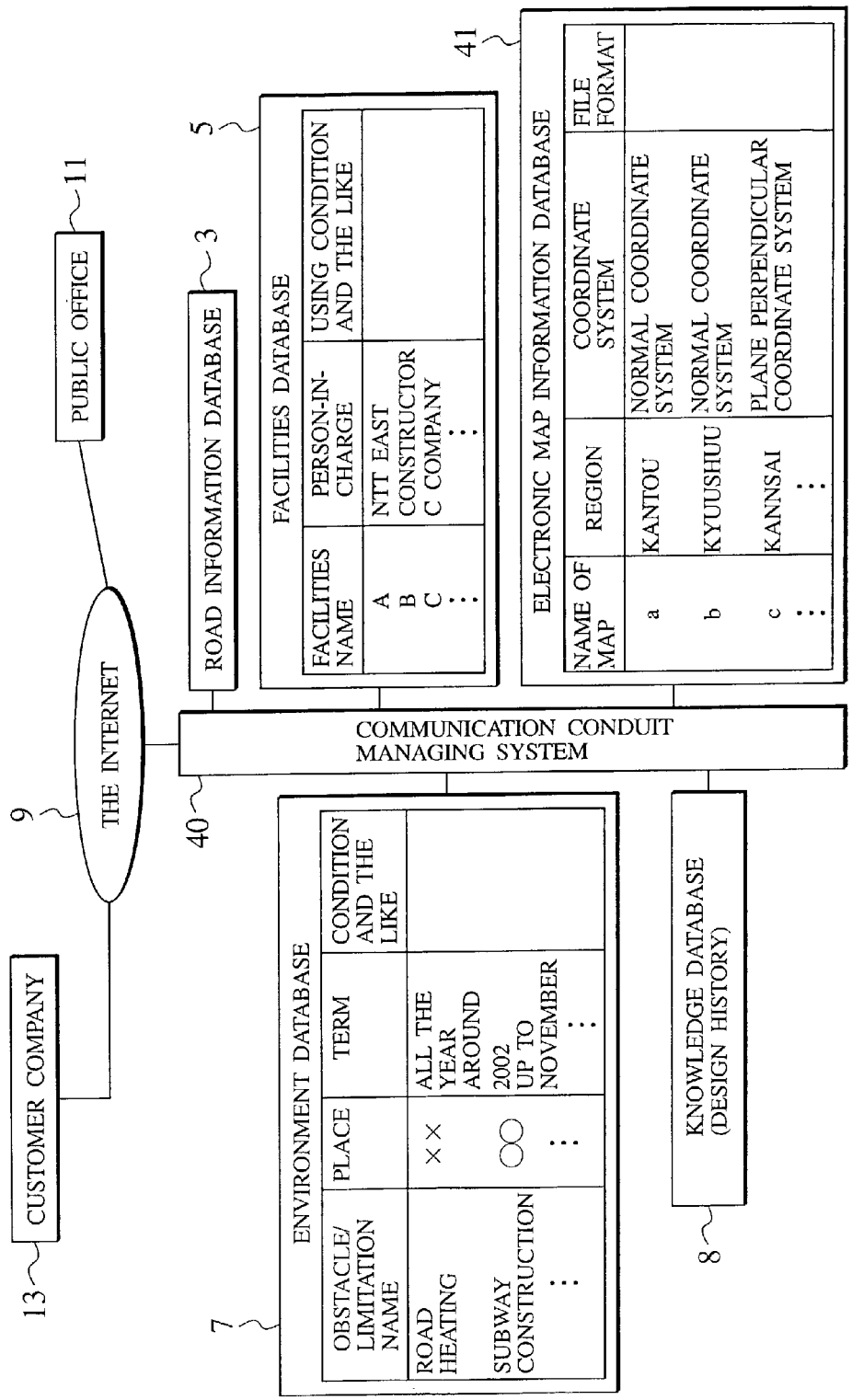
FIG. 8 shows a structure of a system carrying out the communication conduit setting managing method for explaining a second embodiment of the invention.

As shown in FIG. 8, a communication conduit managing system 40 correspond to the structure of the communication conduit managing system 1 shown in the first embodiment, except in that an electronic map information database 41 storing electronic map information and map converting means are provided.

The electronic map information database 41 comprises name of map, region, coordinate system and file format. Example of kinds of the coordinate system are a normal coordinate system, and a plan perpendicular coordinate system. The electronic map information database 41 may be placed in any of a center server or a local server in the communication conduit managing system 1.

The map converting means converts the electronic map information so that the electronic map information can be used in the communication conduit managing system 40. Conversion of the electronic map information includes conversion of coordinate system of the electronic map information or conversion of file format for example.

In the communication conduit managing system 40, electronic map information is extracted from the electronic map information database 41 stored in the communication conduit system, communication route and facilities information displayed on the extracted electronic map are informed to the customer company 13 through the Internet 9, and carried out maintenance and management using the electronic map information.

In the communication conduit managing system 40, communication route is displayed on a specific electronic map such as wide area map information or detailed housing map information from the customer company 13, or maintenance and management are carried out in some cases, but the coordinate system or file format to which the electronic map information is applied using the communication conduit managing system 40 is different in some cases. In such a case, the coordinate system or the file format is converted using the map converting means in the communication conduit managing system 40, the communication route is displayed on the electronic map based on the position information of the communication route, or maintenance and management can be carried out on the electronic map information.

Even when the customer company 13 is not connected to the communication conduit managing system 40 through the Internet 9, the data can be provided by storing the communication route or the facilities information in the storing medium, and by sending the storing medium to the customer company 13.

According to this embodiment, not only the electronic map information stored in the server of the communication conduit managing system, but also electronic map information which is in formed according to a customer can be utilized. As a result, it is possible to display a communication route on an electronic map of any kind of coordinate system or file format, and to carry out the maintenance and management of the existing communication conduit using the electronic map information. Therefore, it is possible to establish more convenient the communication conduit managing system.

License charge of a detailed map (a 2500:1 scale map) is expensive as compared with a wide area map, and the license charge of the map becomes expensive depending on the number of users. Further, the license charge is expensive when it is used in the server as compared when it is utilized by a client, and since the commercially available map software is based on assumption that it is utilized individually, such software is inexpensive, and license charges of map varies depending upon various utilization styles. Therefore, when a customer owns map information displaying an optimal route, it is possible to reduce the wasteful license charge, and as a result, it is possible to reduce the cost that the customer who utilizes this communication conduit managing system bears.

THIRD EMBODIMENT (FIGS. 9 to 13)

In the third embodiment, the communication conduit managing system shown in the second embodiment is improved, image information obtained by shooting a site can be used jointly in real time on the electronic map, and position information of a conduit and the like can be captured easily.

Figure 9:
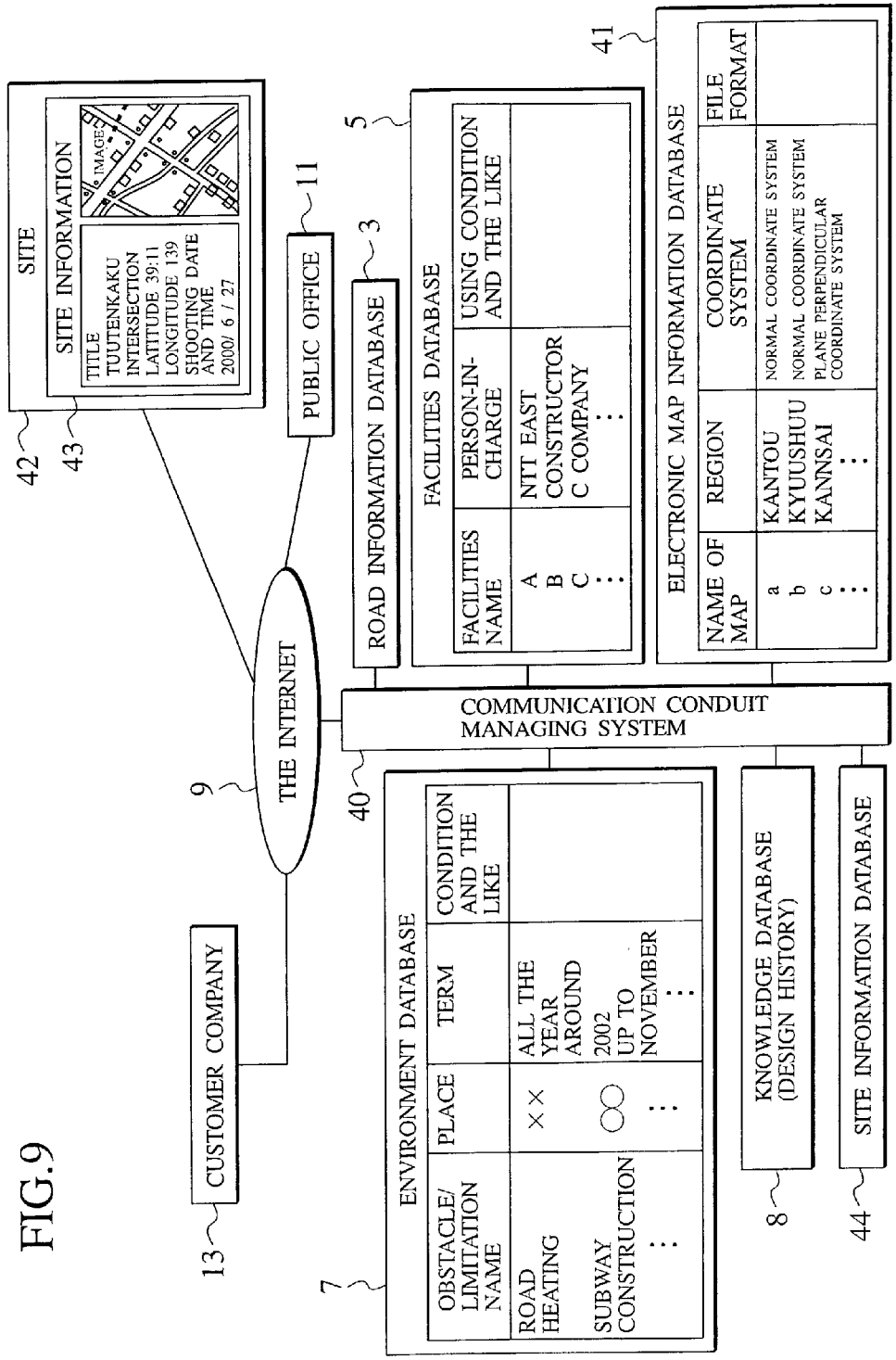
FIG. 9 shows a structure of a system carrying out the communication conduit setting managing method for explaining a third embodiment of the invention.

FIG. 9 shows a structure of the communication conduit managing system. Since this communication conduit managing system is substantially the same as the communication conduit managing system shown in FIG. 8 of the second embodiment, explanation of the same portion is omitted and the same symbols are used.

As shown in FIG. 9, a communication conduit managing system 40 can be connected to a terminal of a site 42 through the Internet 9, and is equipped with the a site information database 44 which accumulates site information sent from the terminal of the site 42.

Figure 10:
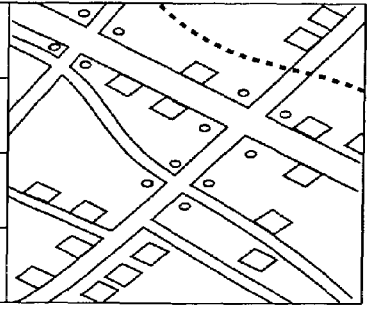
FIG. 10 shows a data structure of site information.

The terminal of the site 42 is a portable terminal such as a cellular phone, a notebook-sized personal computer or a PDA (Personal Digital Assistant). More specifically, the terminal comprises a photographing means for photographing the site, position detecting means for detecting a position of the site, data synthesizing means for synthesizing each data detected from the photographing means and the position detecting means, and outputting means for outputting the synthesized data. A digital camera was used as the photographing means to photograph the site, a GPS antenna was used as the position detecting means, and thus the position information of the site 42 (latitude and longitude) was obtained. Each data is synthesized by the data synthesizing means in association with an acquisition time from the photographed image information and the detected position information of the site 42. A concrete example of the synthesized site information is shown in FIG. 10. As shown in FIG. 10, the site information comprises position information of the site, photographing date and time, and image data obtained by photographing the site.

The latest site information 43 sent from the site 42 is sequentially renewed in the site information database 44 installed in the communication conduit managing system 40, and the hierarchical data is accumulated in the site information database 44. After an operator checked the position information and the like, the site information 43 sent from the site 42 is accumulated in the site information database.

Figure 11:
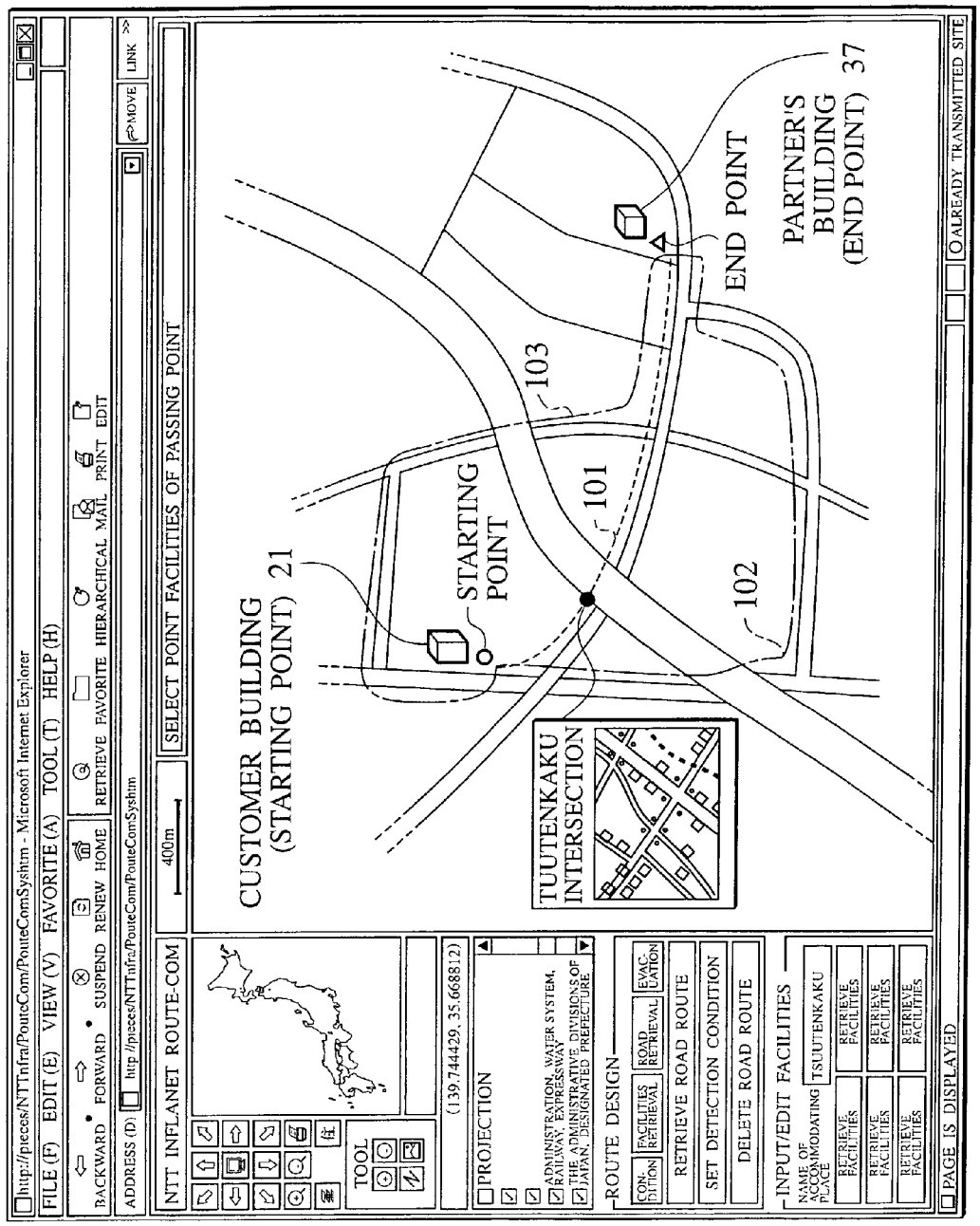
FIG. 11 shows an optimal route between the starting point and the end point and image information of the side in the vicinity between the points displayed on the display screen of the communication conduit managing system shown in FIG. 7 as screen information.

The site information 43 accumulated in the site information database 44 includes the position information of the latitude and longitude of the site 42, and the site image information can be displayed on the electronic map in association with the position information of the site as shown in FIG. 11.

Further, in the site 42, the operator precisely detects a position of a cable buried in the ground using a cable position detector, the position information of the detected cable can be captured in the communication conduit system and the position of the cable can be corrected.

More specifically, the position detector is disposed in the site 42 for obtaining the position information of the cable.

The position detector comprises a cable position detector disposed on the ground, and a current position detecting means such as a GPS antenna disposed in the cable position detector.

The position detector measures a depth position (depth, hereinafter) of the cable buried underground from ground, detects a horizontal position (latitude and longitude) of the cable by the current position detecting means, and thus precisely detects the position information of the buried cable.

The position information such as the depth and the horizontal position detected by the position detector is sent to a server of the communication conduit setting system, and the sent position information of the cable is captured into the communication conduit managing system. The position of the cable in the communication conduit managing system is corrected based on the captured position information of the cable, and the more precise cable position information is introduced into the system.

According to the embodiment, the communication route accommodating the communication materials is displayed on the electronic map, maintenance and management operations can be carried out on the electronic map, and the image information of the site can also be displayed on the electronic map. Therefore, it is possible to confirm the state of the site also on each terminal such as customer company and public office.

Conventionally, the image information of the side is displayed on the map information manually while confirming the position of the site by seeing the image information of the site and thus, labor and time are required for displaying the image information of the site on the map. According to the embodiment, the image information obtained by photographing the site is associated with position information such as latitude and longitude of the site, and the image information of the site and the electronic map information are associated with each other, so that the image information of the site can be displayed on the electronic map information. Therefore, the operation is facilitated, the operation time can be reduced and as a result, the operation efficiency can be enhanced.

Further, according to the embodiment, since the precise image information of the cable and the like can be detected using the position detector, not only the position information (coordinate) of a so-called point facilities such as the manhole (MH), the handhole (HH) and the utility pole, but also continuous position information (coordinate) of a conduit existing between point facilitiess and a cable accommodated in such a conduit can be detected precisely. Therefore, by introducing the detected position information into the communication conduit system, the precision of the communication conduit system is enhanced, and maintenance and management can be carried out precisely.

FOURTH EMBODIMENT (FIG. 12, FIG. 13)

In the fourth embodiment, a Web server is disposed in the communication conduit system, and a Web site is opened on the disposed Web server.

Moving image of the site 42 is included in the Web site, and information of the site 42 is sent in real time. The moving image of the site 42 is obtained by photographing the site 42 by photographing means such as a CCD camera, the moving image information is captured into the communication conduit system through an IP network so that the moving image information can be seen on the Web.

Figure 12:
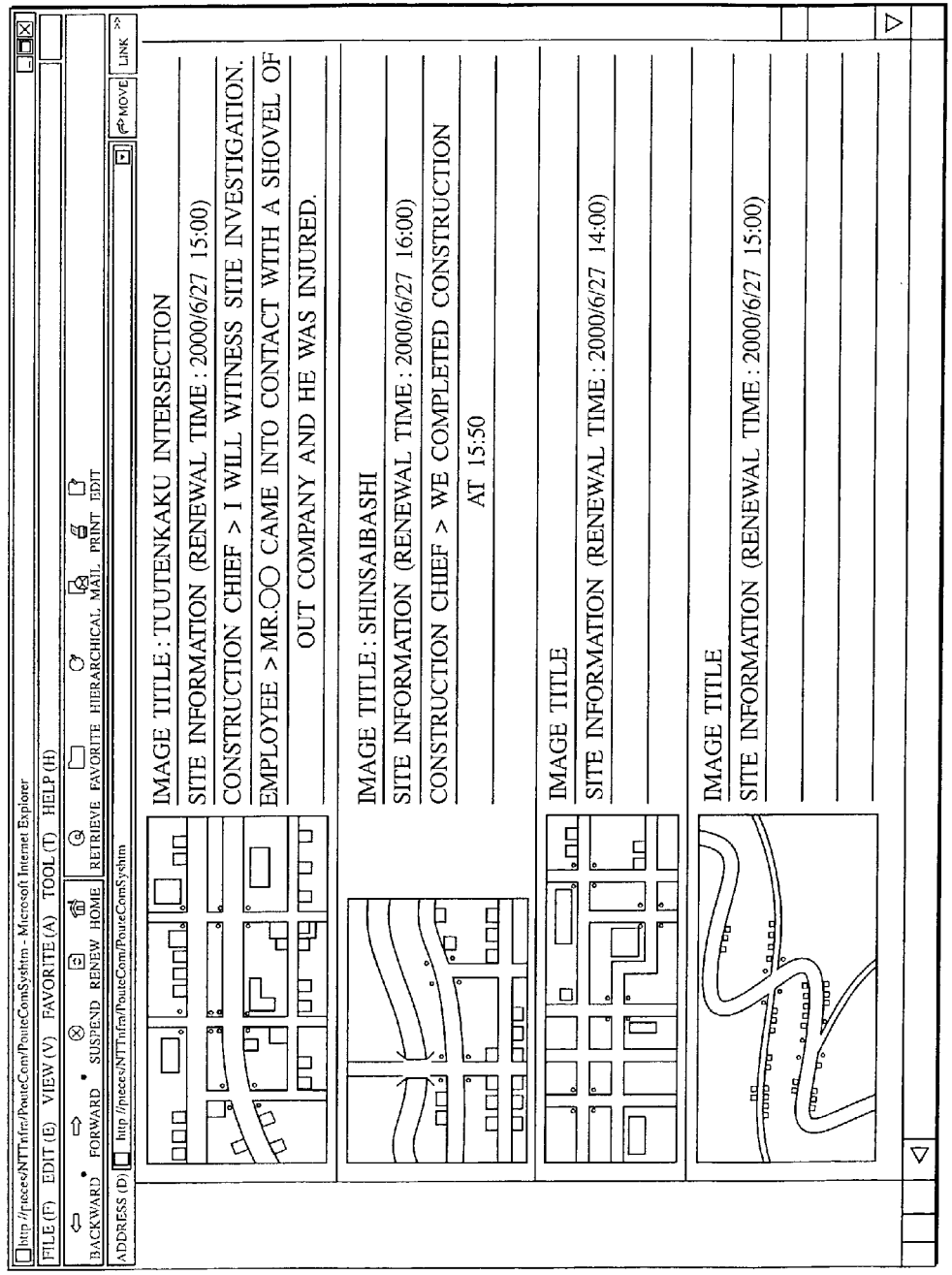
FIG. 12 shows a screen of a Web site provided on a Web server of the communication conduit managing system.
Figure 13:
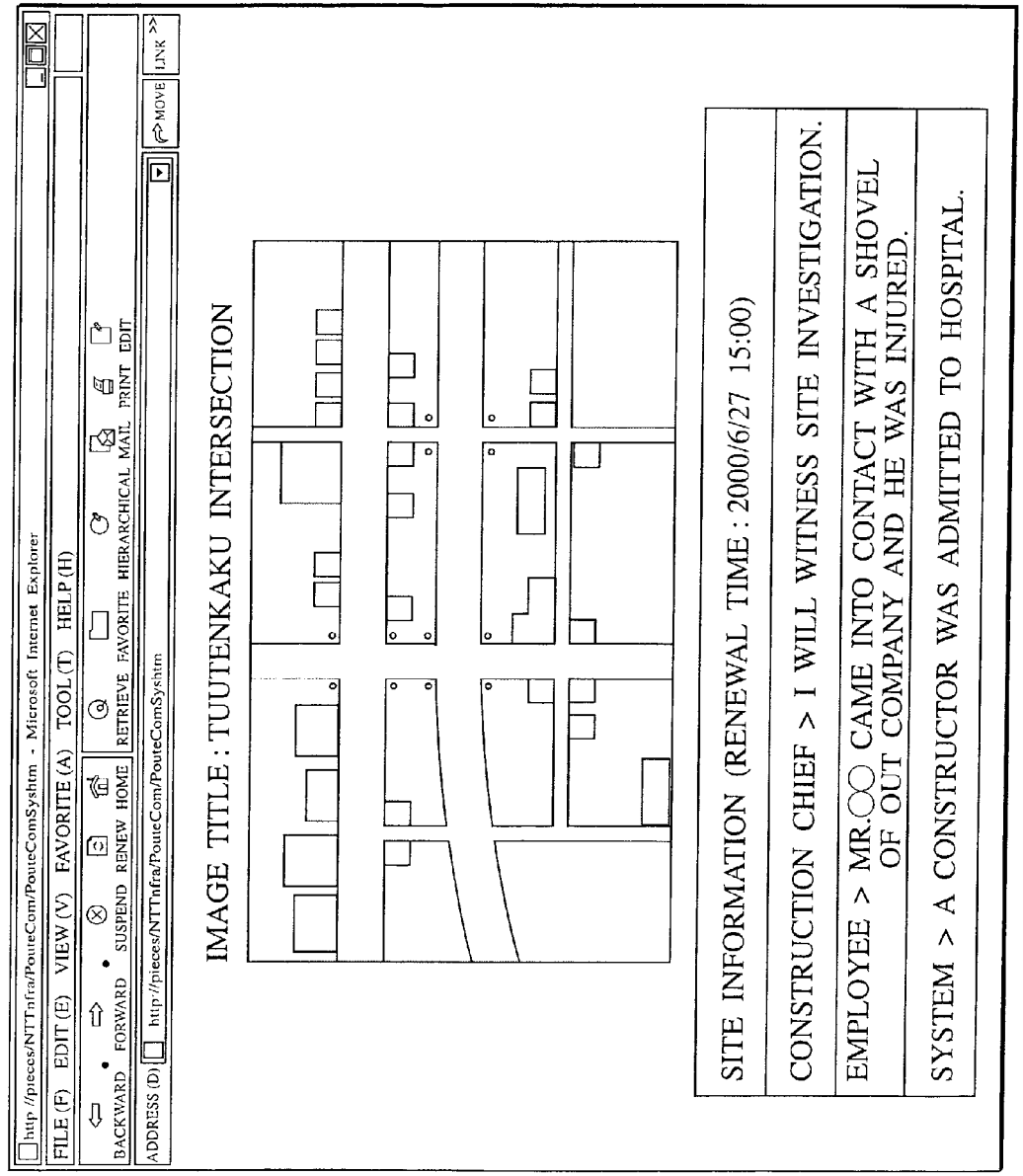
FIG. 13 shows a screen displayed on a site terminal.

The site information 43 from each site 42 is displayed in a form of a list on the Web site in a time series so that the site information 43 can be seen. FIG. 12 shows this state.

As shown in FIG. 12, in the site information 43 of the site 42, the image information and character information of the site 42 are displayed. For example, when the site 42 is a construction site, a state of the site which is being constructed is displayed as the image information, and comments such as "construction was completed at 16:00" is displayed as character information from an operator or a construction chief who is working at the construction site. As shown in a screen of a terminal in the site 42 in FIG. 13, the operator or construction chief can write the comments displayed as the character information anytime through the terminal. If the operator or construction chief writes the comments, the site information 43 is renewed. If the comments are renewed, this is displayed as the latest information. Here, the image data of the site may be any of the moving image or static image.

Such site information 43 of the site 42 is accumulated in the communication conduit managing system whenever it is renewed, the renewed data is stored in the communication conduit managing system as it is, and it can be utilized for future inspection plan while referring to the stored site information.

According to the embodiment, since the site information can be seen as image information or character information such as comments, it can be utilized in the future inspection plan, and the site information can also be utilized for disaster prevention, and for countermeasure when a trouble is generated.

The processing procedures of the communication conduit setting managing method and the communication conduit maintenance managing method are stored in a storing medium as a program or through the communication line, the storing medium is incorporated in a computer system, the program stored in the storing medium is down-loaded to or installed into the computer system, and the computer system is actuated by the program, and the processing procedures of the communication conduit setting managing method and the communication conduit maintenance managing method can be functions as a communication conduit setting managing system and a communication conduit maintenance managing system which carries out the communication conduit setting managing method and the communication conduit maintenance managing method, and the storing medium can make the distribution of the methods enhanced.

As explained above, according to the present invention, the road information database, the facilities database and the obstacle/limitation database are referred to, thereby retrieving a completion-possible route candidate which can complete from the starting point to the end point such that there is no lack or imperfection in the facilities including supplement or new construction of facilities in a route on a road connecting between the starting point and the end point; and calculating a route length, reliability and cost of the retrieved completion-possible route candidate, and determining an optimal route based on the calculated, route length, the reliability and the cost. Therefore, it is possible to efficiently determine the optimal route including not only own facilities but also supplement from outside or facilities of new construction while avoiding obstacle/limitation and while taking a route length, the reliability and cost into consideration, only by inputting the starting point and the end point of the route required by a customer.

Further, according to the invention, the method comprises the steps of: retrieving a plurality of route candidates between a starting point and an end point on a road from the road information database; retrieving obstacle/limitation status existing on a route in each of the route candidates; judging whether there exists obstacle/limitation in each of the routes; selecting a route in which there is no obstacle/limitation as a route having no obstacle/limitation; judging whether obstacle/limitation can be avoided based on avoiding condition of obstacle/limitation when there exists a route having the obstacle/limitation; selecting this route as a route capable of avoiding the obstacle/limitation when it was judged that the obstacle/limitation can be avoided from the result of the judgement; retrieving facilities status existing on the route in each of the plurality of route candidates from the facilities database; judging whether there is a lack or imperfection in facilities in each of routes; selecting a route having no lack or imperfection in facilities as a facilities completion route; judging whether the facilities having the lack or imperfection can be obtained from outside or can be newly constructed when there exists a route having a lack or imperfection in facilities; setting each imperfection of the route so that the facilities are obtained from outside when it is judged that the facilities can be obtained from outside based on a result of the judgement; setting each imperfection of the route so that the facilities are newly be constructed when it is judged that the facilities are newly be constructed; selecting, as a facilities supplement route, a route which can be completed as a route having no lack or imperfection in facilities on a route from the starting point to the end point by combining the imperfection of each route which is set such that the facilities are obtained from outside and the imperfection of each route which is set such that the facilities are newly constructed with each other to replenish the imperfection; verifying the selected route having no obstacle/limitation, the obstacle/limitation avoidable route, the selected facilities completion route and the facilities supplement route, and obtaining a route which can be completed from the starting point to the end point as a completion-possible route candidate; and calculates a route length, reliability and cost of the obtained completion-possible route candidate, and determining an optimal route based on the calculated route length, reliability and cost. Therefore, it is possible to efficiently determine the optimal route including not only own facilities but also supplement from outside or facilities of new construction while avoiding obstacle/limitation and while taking a route length, the reliability and cost into consideration, only by inputting the starting point and the end point of the route required by a customer.

Further, according to the invention, various data of the optimal route and various data used for determining the optimal route are accumulated in the historical information database as historical information and know-how information, and they are managed such that they can be fed back for future design. Therefore, it is possible to more efficiently set the communication conduit by appropriately referring to the accumulated and managed historical information and know-how information.

Further, according to the invention, facilities having lack or imperfection is obtained from an outside facilities owner including another company, another group and public organization. Therefore, not only the own facilities, but also outside facilities are utilized, and setting and maintenance management operation of the communication conduit can efficiently be carried out utilizing the outside facilities.

Further, according to the present invention, the optical cable accommodated in the communication conduit is monitored while testing the same, and if cable abnormal condition information is collected from the optical monitoring system which detects the abnormal condition information of the optical cable, the communication conduit managing system obtains the map information at a point where the abnormal condition is generated, and the map information indicative of the abnormal condition generated point together with the cable abnormal condition information are transmitted to the terminal including the cellular phone of the person in charge of maintenance as the alarm mail. Therefore, when the abnormal condition is generated in the optical cable, the person in charge of maintenance immediately receives the abnormal condition information of the optical cable together with the map information indicative of the abnormal condition generated point through the terminal such as the cellular phone of his or her own, and the person-in-charge can swiftly take necessary procedure for the abnormal condition of the optical cable, and the person-in-charge can refer to the core information of the cable at the same dimension as other facilities information by triple IP, and it is possible to reliably take necessary recovery procedure.

It should be understood that many modifications and adaptations of the invention will become apparent to those skilled in the art and it is intended to encompass such obvious modifications and changes in the scope of the claims appended hereto.

What is claimed is:

1. A computer-implemented communication conduit maintenance managing method, comprising the steps of:
   accumulating and managing road network information using a road information database;
   accumulating and managing facilities information which is useful for setting a conduit using a facilities database together with auxiliary information including a place of facilities, a person-in-charge, and a facilities using condition;
   accumulating and managing a name of an obstacle/limitation against the setting of the conduit, using an obstacle/limitation database, together with accessory information including contents of obstacle/limitation, a place, a period of time, and an avoiding condition of obstacle/limitation;
   accumulating and managing electronic map information using an electronic map information database; and
   appropriately renewing the road information database, the facilities database, the obstacle/limitation database, and the electronic map information database, and carrying out maintenance and management of an existing communication conduit while referring to these databases,
   wherein when a style of the electronic map information is different from a style of the electronic map information in the electronic map information database, the electronic map information is converted, the converted electronic map information is accumulated and managed in the electronic map information database, and maintenance and management of the existing communication conduit are carried out.

2. A computer-implemented communication conduit maintenance managing method, comprising the steps of:
   accumulating and managing road network information using a road information database;
   accumulating and managing facilities information which is useful for setting a conduit using a facilities database together with auxiliary information including a place of facilities, a person-in-charge, and a facilities using condition;
   accumulating and managing a name of an obstacle/limitation against the setting of the conduit, using an obstacle/limitation database, together with accessory information including contents of obstacle/limitation, a place, a period of time, and an avoiding condition of obstacle/limitation;
   accumulating and managing electronic map information using an electronic map information database; and
   appropriately renewing the road information database, the facilities database, and the obstacle/limitation database, and carrying out maintenance and management of an existing communication conduit while referring to these databases,
   wherein when a style of the electronic map information is different from a style of the electronic map information in the electronic map information database, the electronic map information is converted, the converted electronic map information is accumulated and managed in the electronic map information database, and maintenance and management of the existing communication conduit are carried out, and
   wherein a portion of a communication conduit setting managing program is supplied to an outside facility through a communication line.

3. A computer readable medium storing computer-executable instructions for a communication conduit maintenance managing program, comprising the steps of:
   accumulating and managing road network information using a road information database;
   accumulating and managing facilities information which is useful for setting a conduit using a facilities database together with auxiliary information including a place of facilities, a person-in-charge, and a facilities using condition;
   accumulating and managing a name of an obstacle/limitation against the setting of the conduit, using an obstacle/limitation database, together with accessory information including contents of obstacle/limitation, a place, a period of time, and an avoiding condition of obstacle/limitation;

accumulating and managing electronic map information using an electronic map information database; and appropriately renewing the road information database, the facilities database, the obstacle/limitation database, and the electronic map information database, and carrying out maintenance and management of an existing communication conduit while referring to these databases, wherein when a style of the electronic map information is different from a style of the electronic map information in the electronic map information database, the electronic map information is converted, the converted electronic map information is accumulated and managed in the electronic map information database, and maintenance and management of the existing communication conduit are carried out.

4. A communication conduit maintenance managing system, comprising:

a road information database for accumulating and managing road network information;

a facilities database for accumulating and managing facilities information which is useful for setting a conduit together with auxiliary information including a place of facilities, a person-in-charge, and a facilities using condition;

an obstacle/limitation database for accumulating and managing a name of an obstacle/limitation against the setting of the conduit together with accessory information including contents of obstacle/limitation, a place, a period of time, and an avoiding condition of obstacle/limitation;

an electronic map information database for accumulating and managing electronic map information;

a map converting means for converting the electronic map information extracted from the electronic map information database; and a maintenance and managing means which appropriately renews the road information database, the facilities database, the obstacle/limitation database, and the electronic map information database, and carries out maintenance and management of an existing communication conduit while referring to these databases, wherein when a style of the electronic map information is different from a style of the electronic map information in the electronic map information database, the map converting means converts the electronic map information, and the maintenance and managing means accumulates and manages the converted electronic map information in the electronic map information database, and carries out maintenance and management of the existing communication conduit.

5. A communication conduit setting managing method for setting a communication conduit which accommodates a communication material between a desired starting point and an end point, comprising the steps of:

accumulating and managing road network information using a road information database;

accumulating and managing facilities information which is useful for setting a conduit using a facilities database together with auxiliary information including a place of facilities, a person-in-charge, and a facilities using condition;

accumulating and managing a name of an obstacle/limitation against the setting of the conduit, using an obstacle/limitation database, together with accessory information including contents of obstacle/limitation, a place, a period of time, and an avoiding condition of obstacle/limitation;

referring to the road information database, the facilities database and the obstacle/limitation database, and retrieving at least one completion-possible route candidate which can complete from the starting point to the end point such that there is no lack or imperfection in the facilities including supplement or new construction of facilities in a route on a road connecting between the starting point and the end point; and calculating a route length, reliability and cost of the retrieved at least one completion-possible route candidate, and determining an optimal route based on the calculated, route length, reliability and cost.

6. The communication conduit setting managing method according to claim 1, wherein various data of the optimal route and various data used for determining the optimal route are accumulated in a historical information database as historical information and know-how information, and the various data is managed to be fed back for subsequent design.

7. A communication conduit setting managing method for setting a communication conduit which accommodates a communication material between a desired starting point and an end point, comprising the steps of:

accumulating and managing road network information using a road information database;

accumulating and managing facilities information which is useful for setting a conduit using a facilities database together with auxiliary information including a place of facilities, a person-in-charge, and a facilities using condition;

accumulating and managing a name of an obstacle/limitation against the setting of the conduit, using an obstacle/limitation database, together with accessory information including contents of obstacle/limitation, a place, a period of time, and an avoiding condition of obstacle/limitation;

accumulating and managing electronic map information an electronic map information database;

referring to the road information database, the facilities database and the obstacle/limitation database, and retrieving at least one completion-possible route candidate capable of completing from the starting point to the end point such that there is no lack or imperfection while including supplement of facilities or new construction on a route on a road connecting the starting point and the end point and there is no obstacle/limitation while including avoidance of obstacle/limitation;

calculating a route length, reliability and cost of the retrieved at least one completion-possible route candidate, and determining an optimal route based on the calculated route length, reliability and cost; and displaying the determined optimal route on the electronic map information extracted from the electronic map information database.

8. The communication conduit setting managing method according to claim 7, wherein the electronic map information extracted from the electronic map information database is converted, and the optimal route is displayed on the converted electronic map information.

9. A communication conduit setting managing method for setting a communication conduit which accommodates a communication material between a desired starting point and an end point, comprising:

accumulating and managing road network information using a road information database;

accumulating and managing facilities information which is useful for setting a conduit using a facilities database together with auxiliary information including a place of facilities, a person-in-charge, and a facilities using condition;

accumulating and managing a name of an obstacle/limitation against the setting of the conduit using an obstacle/limitation database, together with accessory information including contents of obstacle/limitation, a place, a period of time, and an avoiding condition of obstacle/limitation;

referring to the road information database, the facilities database and the obstacle/limitation database, and retrieving at least one completion-possible route candidate which can complete from the starting point to the end point such that there is no lack or imperfection in the facilities including supplement or new construction of facilities in a route on a road connecting between the starting point and the end point; and calculating a route length, reliability and cost of the retrieved at least one completion-possible route candidate, and determining an optimal route based on the calculated, route length, reliability and cost;

wherein at least a portion of a program for the communication conduit setting managing method is supplied to an outside facility through a communication line.

10. The communication conduit setting managing method according to claim 9, wherein an owner of the outside facility is another company, another group or a public organization.

11. A communication conduit setting managing system for setting a communication conduit which accommodates a communication material between a desired starting point and an end point, comprising:

a road information database for accumulating and managing road network information;

a facilities database for accumulating and managing facilities information which is useful for setting a conduit together with auxiliary information including a place of facilities, a person-in-charge, and a facilities using condition;

an obstacle/limitation database for accumulating and managing a name of an obstacle/limitation against the setting of the conduit together with accessory information including contents of obstacle/limitation, a place, a period of time, and an avoiding condition of obstacle/limitation;

a retrieving means for referring to the road information database, the facilities database and the obstacle/limitation database, and retrieving at least one completion-possible route candidate which can complete from the starting point to the end point such that there is no lack or imperfection in the facilities including supplement or new construction of facilities in a route on a road connecting between the starting point and the end point; and a determining means for calculating a route length, reliability and cost of the retrieved at least one completion-possible route candidate, and determining an optimal route based on the calculated, route length, reliability and cost.

12. The communication conduit setting managing system according to claim 11, further comprising an electronic map information database for accumulating and managing electronic map information; and a map converting means for converting the electronic map information extracted from the electronic map information database.

13. The communication conduit setting managing system according to claim 11, further comprising a historical information database for accumulating various data of the optimal route and various data used for determining the optimal route as historical information and know-how information, and for managing the various data to be fed back for subsequent design.

14. A storing medium which stores therein a communication conduit setting managing program for setting a communication conduit which accommodates a communication material between a desired starting point and an end point, the program comprising the steps of:

accumulating and managing road network information using a road information database;

accumulating and managing facilities information which is useful for setting a conduit using a facilities database together with auxiliary information including a place of facilities, a person-in-charge, and a facilities using condition;

accumulating and managing a name of an obstacle/limitation against the setting of the conduit, using an obstacle/limitation database, together with accessory information including contents of obstacle/limitation, a place, a period of time, and an avoiding condition of obstacle/limitation;

referring to the road information database, the facilities database, and the obstacle/limitation database, and retrieving at least one completion-possible route candidate which can complete from the starting point to the end point such that there is no lack or imperfection in the facilities including supplement or new construction of facilities in a route on a road connecting between the starting point and the end point; and calculating a route length, reliability and cost of the retrieved at least one completion-possible route candidate, and determining an optimal route based on the calculated, route length, reliability and cost.

15. The storing medium which stores therein a communication conduit setting managing program according to claim 14, wherein various data of the optimal route and various data used for determining the optimal route are accumulated in a historical information database as historical information and know-how information, and the various data is managed to be fed back for subsequent design.

16. A communication conduit setting managing method for setting a communication conduit which accommodates a communication material between a desired starting point and an end point, comprising the steps of:

accumulating and managing road network information using a road information database;

accumulating and managing facilities information which is useful for setting a conduit using a facilities database together with auxiliary information including a place of facilities, a person-in-charge, and a facilities using condition;

accumulating and managing a name of an obstacle/limitation against the setting of the conduit using an obstacle/limitation database, together with accessory information including contents of obstacle/limitation, a place, a period of time, and an avoiding condition of obstacle/limitation;

receiving place information identifying the starting point and the end point;

retrieving a plurality of route candidates between the starting point and the end point from the road information database;

determining an obstacle/limitation status for each of the route candidates;

if there is a route having no obstacle/limitation, then selecting the route as a route having no obstacle/limitation;

if there is a route having an obstacle/limitation, then determining whether an avoiding condition avoids the obstacle/limitation;

if the avoiding condition avoids the obstacle/limitation, then selecting the route having the avoidable obstacle/limitation as a route capable of avoiding the obstacle/limitation;

determining a facilities status for each of the plurality of route candidates;

if there is a route having no lack or imperfection in facilities, then selecting the route having no lack or imperfection in facilities as a facilities completion route;

if there is no route having no lack or imperfection in facilities, then determining whether a facility is obtainable from outside or by new construction for a route having lack or imperfection in facilities;

if a facility is obtainable from outside, then selecting a route based on the route having lack or imperfection in facilities and the outside facility as a facilities supplement route;

if a facility is obtainable by new construction, then selecting a route based on the route having lack or imperfection in facilities and the newly constructed facility as the facilities supplement route;

obtaining at least one route which can be completed from the starting point to the end point as a completion-possible route candidate based on the route having no obstacle/limitation or the route capable of avoiding the obstacle/limitation and the facilities completion route or the facilities supplement route; and calculating a route length, reliability and cost of the obtained at least one completion-possible route candidate, and determining an optimal route based on the calculated route length, reliability and cost.

17. The communication conduit setting managing method according to claim 16, wherein an owner of the outside facility is another company, another group or a public organization.

18. A storing medium which stores therein a communication conduit setting managing program for setting a communication conduit which accommodates a communication material between a desired starting point and an end point, the program comprising the steps of:

accumulating and managing road network information using a road information database;

accumulating and managing facilities information which is useful for setting a conduit using a facilities database together with auxiliary information including a place of facilities, a person-in-charge, and a facilities using condition;

accumulating and managing a name of an obstacle/limitation against the setting of the conduit, using an obstacle/limitation database, together with accessory information including contents of obstacle/limitation, a place, a period of time, and an avoiding condition of obstacle/limitation;

receiving place information identifying the starting point and the end point;

retrieving a plurality of route candidates between the starting point and the end point from the road information database;

determining an obstacle/limitation status for each of the route candidates;

if there is a route having no obstacle/limitation, then selecting the route as a route having no obstacle/limitation;

if there is a route having an obstacle/limitation, then determining whether an avoiding condition avoids the obstacle/limitation;

if the avoiding condition avoids the obstacle/limitation, then selecting the route having the avoidable obstacle/limitation as a route capable of avoiding the obstacle/limitation;

determining a facilities status for each of the plurality of route candidates;

if there is a route having no lack or imperfection in facilities, then selecting the route having no lack or imperfection in facilities as a facilities completion route;

if there is no route having no lack or imperfection in facilities, then determining whether a facility is obtainable from outside or by new construction;

if a facility is obtainable from outside, then selecting a route based on the route having lack or imperfection in facilities and the outside facility as a facilities supplement route;

if a facility is obtainable by new construction, then selecting a route based on the route having lack or imperfection in facilities and the newly constructed facility as the facilities supplement route;

obtaining at least one route which can be completed from the starting point to the end point as a completion-possible route candidate based on the route having no obstacle/limitation or the route capable of avoiding the obstacle/limitation and the facilities completion route or the facilities supplement route; and calculating a route length, reliability and cost of the obtained completion-possible route candidate, and determining an optimal route based on the calculated route length, reliability and cost.

19. The storing medium which stores therein a communication conduit setting managing program according to claim 18, wherein various data of the optimal route and various data used for determining the optimal route are accumulated in a historical information database as historical information and know-how information, and the various data is managed to be fed back for subsequent design.

20. The storing medium which stores therein a communication conduit setting managing program according to claim 18, wherein an owner of the outside facility is another company, another group or a public organization.

21. A communication conduit setting managing system for setting a communication conduit which accommodates a communication material between a desired starting point and an end point, comprising:

a road information database for accumulating and managing road network information;

a facilities database for accumulating and managing facilities information which is useful for setting a conduit together with auxiliary information including a place of facilities, a person-in-charge, and a facilities using condition;

an obstacle/limitation database for accumulating and managing a name of an obstacle/limitation against the setting of the conduit together with accessory information including contents of obstacle/limitation, a place, a period of time, and an avoiding condition of obstacle/limitation;

an inputting means for inputting place information of the starting point and the end point;

a route candidate retrieving means for retrieving a plurality of route candidates between the starting point and the end point from the road information database;

an obstacle/limitation status determining means for determining an obstacle/limitation status in each of the route candidates, and if there is a route having no obstacle/limitation, then selecting the route as a route having no obstacle/limitation, if there is a route having an obstacle/limitation, then determining whether an avoiding condition avoids the obstacle/limitation, and if the avoiding condition avoids the obstacle/limitation, then selecting the route having the avoidable obstacle/limitation as a route capable of avoiding the obstacle/limitation;

facilities status determining means for determining facilities status in each of the plurality of route candidates from the facilities database, and if there is a route having no lack or imperfection in facilities, then selecting the route having no lack or imperfection in facilities as a facilities completion route, if there is a route having lack or imperfection in facilities, then determining whether a facility is obtainable from outside or by new construction, if a facility is obtainable from outside, then selecting a route based on the route having lack or imperfection in facilities and the outside facility as a facilities supplement route, if a facility is obtainable by new construction, then selecting a route based on the route having lack or imperfection in facilities and the newly constructed facility as the facilities supplement route;

a completion-possible route candidate obtaining means for obtaining at least one route which can be completed from the starting point to the end point as a completion-possible route candidate based on the route having no obstacle/limitation or the route capable of avoiding the obstacle/limitation and the selected facilities completion route or the facilities supplement route; and an optimal route determining means for calculating a route length, reliability and cost of the obtained completion-possible route candidate, and determining an optimal route based on the calculated route length, reliability and cost.

22. The communication conduit setting managing system according to claim 21, further comprising an electronic map information database for accumulating and managing electronic map information; and a map converting means for converting the electronic map information extracted from the electronic map information database.

23. The communication conduit setting managing system according to claim 21, further comprising a historical information database for accumulating various data of the optimal route and various data used for determining the optimal route as historical information and know-how information, and for managing the various data to be fed back for subsequent design.

24. The communication conduit setting managing system according to claim 21, wherein an owner of the outside facility is another company, another group or a public organization.

* * * * *